(12) United States Patent
Maamari et al.

(10) Patent No.: US 12,495,448 B2
(45) Date of Patent: Dec. 9, 2025

(54) TECHNIQUES FOR ALIGNING COMMUNICATIONS

(71) Applicant: QUALCOMM Incorporated, San Diego, CA (US)

(72) Inventors: Diana Maamari, San Diego, CA (US); Huilin Xu, Temecula, CA (US); Wei Yang, San Diego, CA (US); Mickael Mondet, Louannec (FR); Linhai He, San Diego, CA (US); Prashanth Haridas Hande, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 18/148,200

(22) Filed: Dec. 29, 2022

(65) Prior Publication Data
US 2024/0224328 A1 Jul. 4, 2024

(51) Int. Cl.
*H04W 74/0816* (2024.01)
*H04W 72/11* (2023.01)
*H04W 74/08* (2024.01)

(52) U.S. Cl.
CPC ........ *H04W 74/0816* (2013.01); *H04W 72/11* (2023.01); *H04W 74/0866* (2013.01)

(58) Field of Classification Search
CPC ......... H04W 52/0241; H04W 52/0216; H04W 52/0229; H04W 52/028; H04W 68/025; H04W 52/0245; H04W 76/27; H04W 76/28; H04W 74/0816; H04W 72/11; H04W 74/0866; Y02D 30/70
See application file for complete search history.

(56) References Cited

U.S. PATENT DOCUMENTS

| | | | |
|---|---|---|---|
| 2021/0410069 A1* | 12/2021 | Jo | H04L 5/0053 |
| 2022/0045806 A1* | 2/2022 | Cirik | H04L 1/1887 |
| 2022/0182943 A1* | 6/2022 | Maleki | H04W 52/0216 |
| 2024/0089960 A1* | 3/2024 | Hao | H04W 72/0446 |

FOREIGN PATENT DOCUMENTS

WO    WO 2023155197 A1 * 8/2023

* cited by examiner

Primary Examiner — Rushil P. Sampat
(74) Attorney, Agent, or Firm — Holland & Hart LLP

(57) ABSTRACT

Methods, systems, and devices for method for wireless communication are described. A user equipment (UE) may receive first control signaling indicating a first set of communication occasions for periodic transmission or periodic reception in accordance with a first periodicity and may receive second control signaling indicating a second set of communication occasions that differs in timing from the first set of communication occasions. The UE may shift a first occasion of the first set of communication occasions to align the first occasion of the first set of communication occasions within a threshold time period from a first occasion of the second set of communication occasions. The UE may then communicate on the first occasion of the second set of communication occasions and on the first occasion of the first set of communication occasions.

26 Claims, 17 Drawing Sheets

TECHNIQUES FOR ALIGNING COMMUNICATIONS

FIELD OF TECHNOLOGY

The following relates to method for wireless communication, including techniques for aligning communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for aligning communications. For example, the described techniques provide for alignment of a first communication occasion to be within a threshold time period from a second communication occasion. To reduce overhead, a UE may shift a first occasion of a first set of communication occasions to align the first occasion of the first set of communication occasions within a threshold time period from a first occasion of a second set of communication occasions. The first set of communication occasions may be associated with a configured activity and the second set of communication occasions may be associated with a configured activity or a dynamic activity. In some examples, the UE may transmit uplink signaling indicating that the first occasion of the first set of communication occasions is to be shifted. The UE and the network entity may then communicate on the first occasion of the second set of communication occasions and on the first occasion of the first set of communication occasions.

A method for wireless communication at a user equipment (UE) is described. The method may include receiving first control signaling indicating a first set of communication occasions for periodic transmission or periodic reception in accordance with a first periodicity, receiving second control signaling indicating a second set of communication occasions that differs in timing from the first set of communication occasions, shifting a first occasion of the first set of communication occasions to align the first occasion of the first set of communication occasions within a threshold time period from a first occasion of the second set of communication occasions, and communicating on the first occasion of the second set of communication occasions and on the first occasion of the first set of communication occasions.

An apparatus for wireless communication at a UE is described. The apparatus may include a processor, memory coupled with the processor, and instructions stored in the memory. The instructions may be executable by the processor to cause the apparatus to receive first control signaling indicating a first set of communication occasions for periodic transmission or periodic reception in accordance with a first periodicity, receive second control signaling indicating a second set of communication occasions that differs in timing from the first set of communication occasions, shift a first occasion of the first set of communication occasions to align the first occasion of the first set of communication occasions within a threshold time period from a first occasion of the second set of communication occasions, and communicate on the first occasion of the second set of communication occasions and on the first occasion of the first set of communication occasions.

Another apparatus for wireless communication at a UE is described. The apparatus may include means for receiving first control signaling indicating a first set of communication occasions for periodic transmission or periodic reception in accordance with a first periodicity, means for receiving second control signaling indicating a second set of communication occasions that differs in timing from the first set of communication occasions, means for shifting a first occasion of the first set of communication occasions to align the first occasion of the first set of communication occasions within a threshold time period from a first occasion of the second set of communication occasions, and means for communicating on the first occasion of the second set of communication occasions and on the first occasion of the first set of communication occasions.

A non-transitory computer-readable medium storing code for wireless communication at a UE is described. The code may include instructions executable by a processor to receive first control signaling indicating a first set of communication occasions for periodic transmission or periodic reception in accordance with a first periodicity, receive second control signaling indicating a second set of communication occasions that differs in timing from the first set of communication occasions, shift a first occasion of the first set of communication occasions to align the first occasion of the first set of communication occasions within a threshold time period from a first occasion of the second set of communication occasions, and communicate on the first occasion of the second set of communication occasions and on the first occasion of the first set of communication occasions.

In some examples of the method, apparatuses, and non-transitory computer-readable medium described herein, the second set of communication occasions differs in timing from the first set of communication occasions through a timing of the first occasion of the second set of communication occasions with respect to the first occasion of the first set of communication occasions or through a second periodicity for the second set of communication occasions with respect to the first periodicity.

Some examples of the method, apparatuses, and non-transitory computer-readable medium described herein may further include operations, features, means, or instructions for transmitting an uplink message that may be indicative that the UE may be to shift the first occasion of the first set of communication occasions to align the first occasion of the first set of communication occasions within the threshold time period.

In some examples of the method, apparatuses, and non-transitory computer-readable medium described herein, the uplink message may be a scheduling request that may be not associated with a corresponding buffer status report.

In some examples of the method, apparatuses, and non-transitory computer-readable medium described herein, the uplink message may be a scheduling request that includes a flag to distinguish the scheduling request from a legacy request associated with a buffer status report.

In some examples of the method, apparatuses, and non-transitory computer-readable medium described herein, transmitting the uplink message may include operations, features, means, or instructions for transmitting an indication of a time by which the first occasion of the second set of communication occasions may be to be shifted.

In some examples of the method, apparatuses, and non-transitory computer-readable medium described herein, transmitting the uplink message may include operations, features, means, or instructions for transmitting the uplink message in resources dedicated for indicating that the UE may be to shift the first occasion of the first set of communication occasions to align the first occasion of the first set of communication occasions within the threshold time period.

In some examples of the method, apparatuses, and non-transitory computer-readable medium described herein, transmitting the uplink message may include operations, features, means, or instructions for transmitting the uplink message multiplexed with a scheduled configured grant physical uplink shared channel message.

In some examples of the method, apparatuses, and non-transitory computer-readable medium described herein, shifting the first occasion of the first set of communication occasions may include operations, features, means, or instructions for shifting the first occasion of the first set of communication occasions by a timing value with respect to a transmission time of the uplink message.

In some examples of the method, apparatuses, and non-transitory computer-readable medium described herein, shifting the first occasion of the first set of communication occasions may include operations, features, means, or instructions for shifting the first occasion of the first set of communication occasions by a timing value with respect to a timing of an anchor configured grant transmission occasion.

Some examples of the method, apparatuses, and non-transitory computer-readable medium described herein may further include operations, features, means, or instructions for receiving a downlink message that may be indicative that the UE may be to shift the first occasion of the first set of communication occasions to align the first occasion of the first set of communication occasions within the threshold time period.

In some examples of the method, apparatuses, and non-transitory computer-readable medium described herein, the downlink message may be one of a scheduling downlink control information message or a non-scheduling downlink control information message.

Some examples of the method, apparatuses, and non-transitory computer-readable medium described herein may further include operations, features, means, or instructions for shifting the first occasion of the first set of communication occasions may be conditioned on the first occasion of the first set of communication occasions being at least a minimum time duration, prior to shifting, after receipt of the downlink message.

Some examples of the method, apparatuses, and non-transitory computer-readable medium described herein may further include operations, features, means, or instructions for shifting the first occasion of the first set of communication occasions may be conditioned on the first occasion of the first set of communication occasions being less than a maximum time duration before or after the first occasion of the second set of communication occasions.

In some examples of the method, apparatuses, and non-transitory computer-readable medium described herein, the downlink message includes a dynamic triggering offset indicating an amount of time the first occasion of the first set of communication occasions may be to be shifted.

Some examples of the method, apparatuses, and non-transitory computer-readable medium described herein may further include operations, features, means, or instructions for receiving a single downlink control information message that schedules multiple resource allocations for uplink transmissions and selecting one of the multiple resource allocations as the first occasion of the second set of communication occasions, the selection based on a timing proximity of the first occasion of the first set of communication occasions with individual ones of the multiple resource allocations.

In some examples of the method, apparatuses, and non-transitory computer-readable medium described herein, the first set of communication occasions may be associated with a first configured grant and the second set of communication occasions may be associated with a second configured grant.

In some examples of the method, apparatuses, and non-transitory computer-readable medium described herein, the first set of communication occasions may be associated with a configured grant and the second set of communication occasions may be associated with a dynamic grant.

In some examples of the method, apparatuses, and non-transitory computer-readable medium described herein, the first set of communication occasions may be associated with a first semi-persistent scheduling configuration and the method, apparatuses, and non-transitory computer-readable medium may include further operations, features, means, or instructions for monitoring for a wake up signal, where failure to detect the wake up signal triggers the shifting of the first occasion of the first set of communication occasions.

A method for wireless communication at a network entity is described. The method may include transmitting, to a UE first control signaling indicating a first set of communication occasions for periodic transmission or periodic reception in accordance with a first periodicity, transmitting, to the UE, second control signaling indicating a second set of communication occasions that differs in timing from the first set of communication occasions, and communicating on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions.

An apparatus for wireless communication at a network entity is described. The apparatus may include a processor, memory coupled with the processor, and instructions stored in the memory. The instructions may be executable by the processor to cause the apparatus to transmit, to a UE first control signaling indicating a first set of communication occasions for periodic transmission or periodic reception in accordance with a first periodicity, transmit, to the UE, second control signaling indicating a second set of communication occasions that differs in timing from the first set of communication occasions, and communicate on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions.

Another apparatus for wireless communication at a network entity is described. The apparatus may include means for transmitting, to a UE first control signaling indicating a first set of communication occasions for periodic transmission or periodic reception in accordance with a first periodicity, means for transmitting, to the UE, second control signaling indicating a second set of communication occasions that differs in timing from the first set of communication occasions, and means for communicating on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions.

A non-transitory computer-readable medium storing code for wireless communication at a network entity is described. The code may include instructions executable by a processor to transmit, to a UE first control signaling indicating a first set of communication occasions for periodic transmission or periodic reception in accordance with a first periodicity, transmit, to the UE, second control signaling indicating a second set of communication occasions that differs in timing from the first set of communication occasions, and communicate on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions.

In some examples of the method, apparatuses, and non-transitory computer-readable medium described herein, the second set of communication occasions differs in timing from the first set of communication occasions through a timing of the first occasion of the second set of communication occasions with respect to the first occasion of the first set of communication occasions or through a second periodicity for the second set of communication occasions with respect to the first periodicity.

Some examples of the method, apparatuses, and non-transitory computer-readable medium described herein may further include operations, features, means, or instructions for receiving an uplink message that may be indicative that the UE may be to shift the first occasion of the first set of communication occasions to align the first occasion of the first set of communication occasions within the threshold time period.

In some examples of the method, apparatuses, and non-transitory computer-readable medium described herein, the uplink message may be a scheduling request that may be not associated with a corresponding buffer status report.

In some examples of the method, apparatuses, and non-transitory computer-readable medium described herein, the uplink message may be a scheduling request that includes a flag to distinguish the scheduling request from a legacy request associated with a buffer status report.

In some examples of the method, apparatuses, and non-transitory computer-readable medium described herein, receiving the uplink message may include operations, features, means, or instructions for receiving an indication of a time by which the first occasion of the second set of communication occasions may be to be shifted.

In some examples of the method, apparatuses, and non-transitory computer-readable medium described herein, receiving the uplink message may include operations, features, means, or instructions for receiving the uplink message in resources dedicated for indicating that the UE may be to shift the first occasion of the first set of communication occasions to align the first occasion of the first set of communication occasions within the threshold time period.

In some examples of the method, apparatuses, and non-transitory computer-readable medium described herein, receiving the uplink message may include operations, features, means, or instructions for receiving the uplink message multiplexed with a scheduled configured grant physical uplink shared channel message.

In some examples of the method, apparatuses, and non-transitory computer-readable medium described herein, the UE shifts the first occasion of the first set of communication occasions by a timing value with respect to a transmission time of the uplink message.

In some examples of the method, apparatuses, and non-transitory computer-readable medium described herein, the UE shifts the first occasion of the first set of communication occasions by a timing value with respect to a timing of an anchor configured grant transmission occasion.

Some examples of the method, apparatuses, and non-transitory computer-readable medium described herein may further include operations, features, means, or instructions for transmitting a downlink message that may be indicative that the UE may be to shift the first occasion of the first set of communication occasions to align the first occasion of the first set of communication occasions within the threshold time period.

In some examples of the method, apparatuses, and non-transitory computer-readable medium described herein, the downlink message may be one of a scheduling downlink control information message or a non-scheduling downlink control information message.

In some examples of the method, apparatuses, and non-transitory computer-readable medium described herein, shifting of the first occasion of the first set of communication occasions may be conditioned on the first occasion of the first set of communication occasions being at least a minimum time duration, prior to shifting, after receipt of the downlink message.

In some examples of the method, apparatuses, and non-transitory computer-readable medium described herein, shifting of the first occasion of the first set of communication occasions may be conditioned on the first occasion of the first set of communication occasions being less than a maximum time duration before or after the first occasion of the second set of communication occasions.

In some examples of the method, apparatuses, and non-transitory computer-readable medium described herein, the downlink message includes a dynamic triggering offset indicating an amount of time the first occasion of the first set of communication occasions may be to be shifted.

Some examples of the method, apparatuses, and non-transitory computer-readable medium described herein may further include operations, features, means, or instructions for transmitting a single downlink control information message that schedules multiple resource allocations for uplink transmissions, where one of the multiple resource allocations may be selected as the first occasion of the second set of communication occasions based on a timing proximity of the first occasion of the first set of communication occasions with individual ones of the multiple resource allocations.

In some examples of the method, apparatuses, and non-transitory computer-readable medium described herein, the first set of communication occasions may be associated with a first configured grant and the second set of communication occasions may be associated with a second configured grant.

In some examples of the method, apparatuses, and non-transitory computer-readable medium described herein, the first set of communication occasions may be associated with a configured grant and the second set of communication occasions may be associated with a dynamic grant.

In some examples of the method, apparatuses, and non-transitory computer-readable medium described herein, the first set of communication occasions may be associated with a first semi-persistent scheduling configuration and the method, apparatuses, and non-transitory computer-readable medium may include further operations, features, means, or instructions for transmitting a wake up signal, where refraining from transmitting the wake up signal triggers the shifting of the first occasion of the first set of communication occasions.

DETAILED DESCRIPTION

Figure 1:
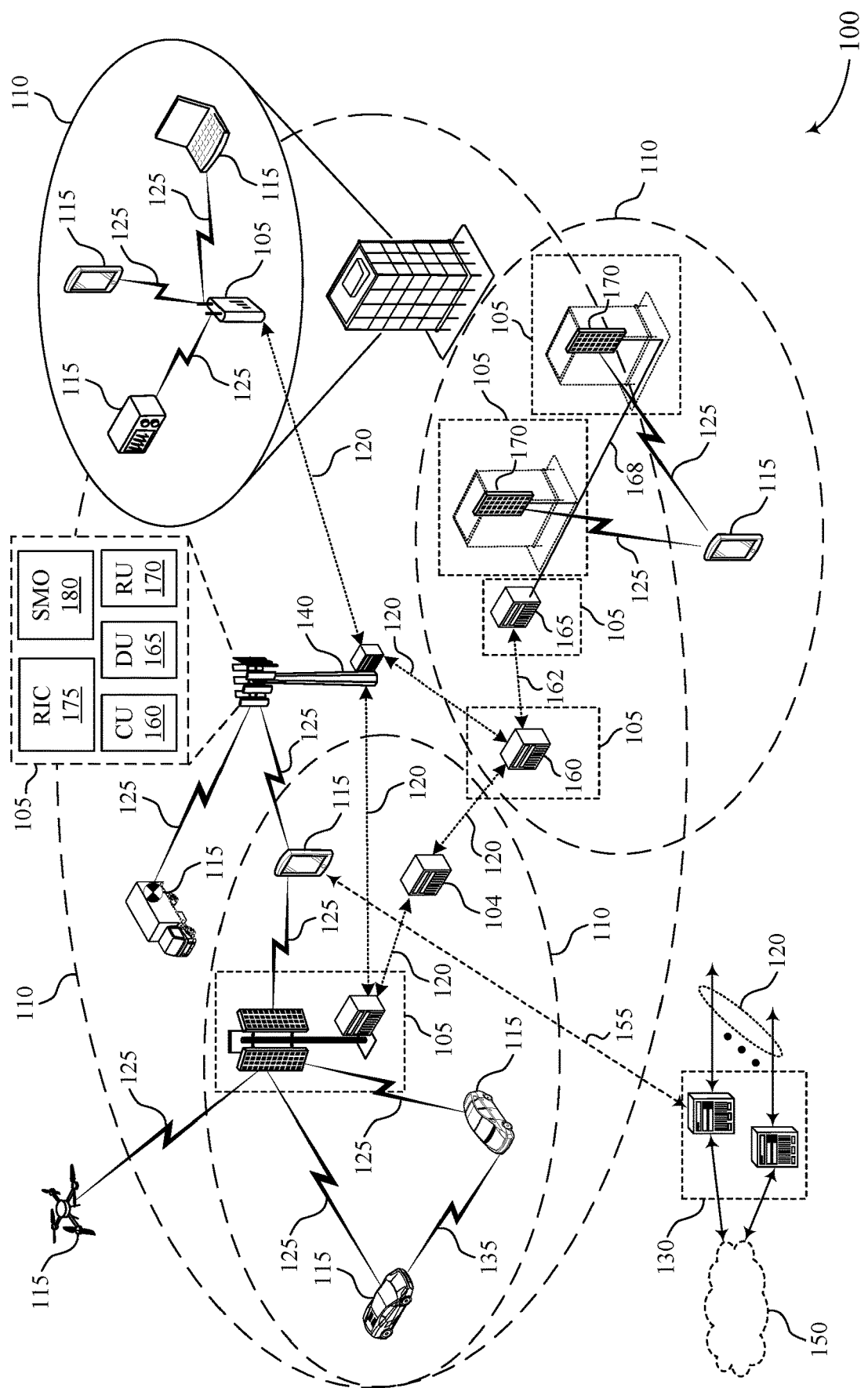
FIG. 1 illustrates an example of a wireless communications system that supports techniques for aligning communications in accordance with one or more aspects of the present disclosure.

Wireless communications systems may support traffic that includes both uplink communication and downlink communication. Additionally, a user equipment (UE) may be designed to enter a sleep mode in between transmissions. Thus, when communicating with another device, a modem of a UE wakes up to either transmit data or receive data. If downlink traffic and uplink traffic are received and transmitted at different times, then the UE may not be able to remain in a sleep state for a long enough time to provide much power savings.

Techniques described herein provide for aligning the timing of different types of communications. Aligning communications may help the UE enter longer periods of sleep and thereby save power. According to one or more aspects described herein, a UE and a network entity may support alignment of configured activity (uplink configured grants or downlink semi-persistent scheduling (SPS)) with either other configured activities having a different periodicity or with other dynamic activities (an uplink or downlink message that is dynamically scheduled by the network entity). In an uplink scenario, a UE may receive a configuration for configured grant transmissions having a first periodicity. The UE may also receive a second configuration for different configured grant transmissions having a second periodicity. The UE may elect to shift an uplink transmission for one of the configured grant configurations to be within a threshold time period from a transmission associated with the other configured grant configuration. Similarly, in cases where the UE receives a dynamic grant for an uplink transmission, the UE may shift an uplink transmission for the configured grant configuration to be within a threshold time period from the dynamically-scheduled uplink transmission. The shifting may be autonomously done by the UE. In such cases, the UE may notify the network entity that a configured grant transmission has been shifted. Alternatively, the network entity may provide information to the UE to facilitate the shift of a communication occasion (e.g., minimum and maximum shifting times).

In some examples, the network entity may shift downlink transmissions, such as downlink semi-persistent scheduling transmissions, for the downlink semi-persistent scheduling transmission to be closer in time with other scheduled transmissions. In these cases, the network entity may use a wake-up signal or the absence of a wake-up signal to indicate to the UE whether to expect a downlink semi-persistent scheduling transmission during a scheduled semi-persistent scheduling occasion or during a shifted semi-persistent scheduling occasion.

Aspects of the disclosure are initially described in the context of wireless communications systems. Aspects of the disclosure are further described in the context of communication timelines and a process flow. Aspects of the disclosure are further illustrated by and described with reference to apparatus diagrams, system diagrams, and flowcharts that relate to techniques for aligning communications.

FIG. 1 illustrates an example of a wireless communications system 100 that supports techniques for aligning communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parents nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for aligning communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

According to one or more aspects depicted herein, a UE 115 may receive first control signaling indicating a first set of communication occasions for periodic transmission or periodic reception in accordance with a first periodicity. The UE 115 may also receive second control signaling indicating a second set of communication occasions that differs in timing from the first set of communication occasions. In some examples, the second set of communication occasions may differ in timing from the first set of communication occasions through a timing of the first occasion of the second set of communication occasions with respect to the first occasion of the first set of communication occasions or through a second periodicity for the second set of communication occasions with respect to the first periodicity. The UE 115 may shift a first occasion of the first set of communication occasions to align the first occasion of the first set of communication occasions within a threshold time period from a first occasion of the second set of communication occasions. The UE 115 may then communicate on the first occasion of the second set of communication occasions and on the first occasion of the first set of communication occasions.

Figure 2:
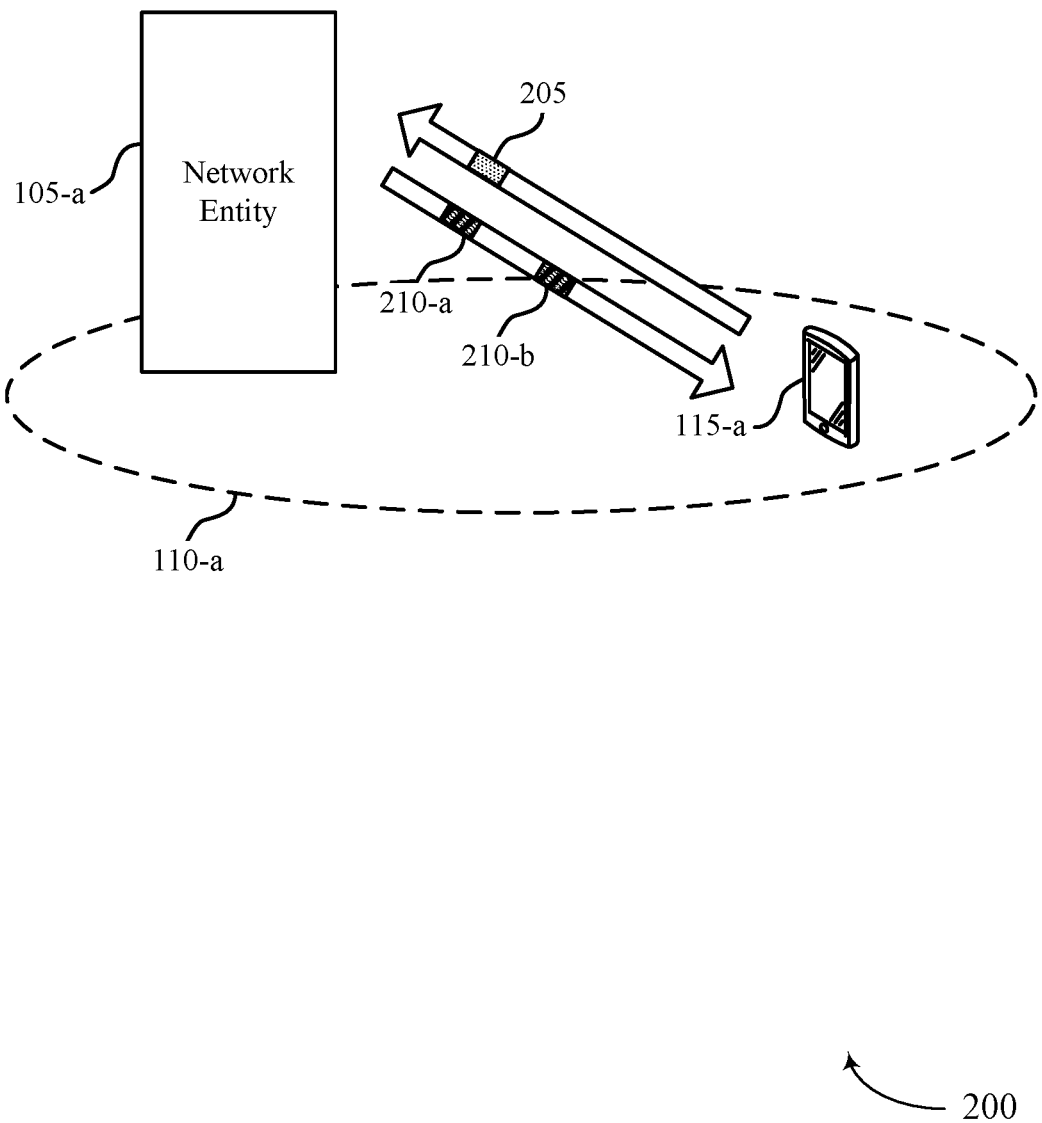
FIG. 2 illustrates an example of a wireless communications system that supports techniques for aligning communications in accordance with one or more aspects of the present disclosure.

FIG. 2 illustrates an example of a wireless communications system 200 that supports techniques for aligning communications in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a, which may be examples of corresponding devices described herein. The UE 115-a and the network entity 105-a may communicate within a geographic region 110-a.

In some examples, the wireless communications system 200 may support techniques for aligning communications. In such cases, the network entity 105-a and the UE 115-a may support various types of communication traffic, In some instances, traffic (e.g., extended reality traffic) may include both uplink communication and downlink communication. Both uplink communication traffic and downlink communication traffic may be periodic in nature. A UE (e.g., UE 115-*a*) may be designed to enter a sleep mode in between transmissions. Thus, when communicating with another device, a modem of a UE wakes up to either transmit data or receive data. When not communicating, the modem of the UE may enter lower power state to save battery. If downlink traffic and uplink traffic are received and transmitted at different times, then the modem may wake up each time downlink traffic is transmitted or uplink traffic is received. The UE 115-*a* may wake up from a sleep state to process incoming or outgoing communications. If downlink traffic and uplink traffic are received and transmitted at different times, then the UE may not be able to remain in a sleep state for a long enough time to provide much power savings. Thus, aligning downlink and uplink traffic (e.g., downlink and uplink activities) may help the UE 115-*a* enter longer periods of sleep. In addition, aligning different types of communications may be helpful in reducing an awake time for the UE 115-*a* and may accordingly reduce UE power consumption.

In some examples, the UE 115-*a* may support bundling of various communications. Such bundling may be useful for uplink pose or control uplink packets. For instance, control uplink packets may arrive every 4 msec and a delay budget may be 10 msec. In such cases, the UE 115-*a* may be able to bundle packets and still meet the delay budget. Transmission of the extended reality pose or control may include information generated from 2 periods. The UE 115-*a* and the network entity 105-*a* may both be aligned for decoding. The wireless communications system 200 may support bundling in the time domain or the frequency domain (e.g., on a large set of resource blocks). In some instances, the UE 115-*a* may enter a state of light sleep instead of microsleep when bundling is implemented by the wireless communications system 200.

According to one or more aspects of the present disclosure, the wireless communications system 200 may support alignment of configured activity (uplink configured grants or downlink semi-persistent scheduling) with either other configured activity having a different periodicity or with dynamic activity (an uplink or downlink message that is dynamically scheduled). As depicted herein, the configured activity may include a configured grant, a downlink semi-persistent scheduling, a physical downlink control channel monitoring occasion, a channel state information reference signal, a sounding reference signal, or a combination thereof. In some examples, the UE 115-*a* may use the configured activity to transmit uplink pose or control. In some examples, the dynamic activity may include cross-slot scheduled or triggered physical uplink shared channel or physical downlink shared channel, channel state information reference signal, physical downlink control channel skipping, physical downlink control channel for feedback (e.g., HARQ-ACK), or a combination thereof.

The UE 115-*a* and the network entity 105-*a* may support alignment of configured activities with different periodicities. In some examples, for two configured grants to be aligned, they may not have the same periodicity (as the network entity can already configure two configured grant configurations with alignments). Two configured grants may have same periodicity with different offsets (e.g. slot n and slot n+1). Additionally, or alternatively, the UE 115-*a* and the network entity 105-*a* may support alignment in the downlink between downlink semi-persistent scheduling and a downlink grant.

The UE 115-*a* may receive a first control signaling 210-*a* indicating a first set of communication occasions for periodic transmission or periodic reception in accordance with a first periodicity. The UE 115-*a* may then receive a second control signaling 210-*b* indicating a second set of communication occasions that differs in timing from the first set of communication occasions. In some examples, the first set of communication occasions may be associated with a first configured grant, and the second set of communication occasions may be associated with a second configured grant. Alternatively, the first set of communication occasions may be associated with a configured grant, and the second set of communication occasions may be associated with a dynamic grant.

In a case where both the first set of communication occasions and the second set of communication occasions are configured grants, the UE 115-*a* may elect to shift an uplink transmission for one of the configured grant configurations to be close (in time) to a transmission associated with the other configured grant configuration. For instance, the UE 115-*a* may shift a first occasion of the first set of communication occasions to align the first occasion of the first set of communication occasions within a threshold time period from a first occasion of the second set of communication occasions. In some examples, the network entity 105-*a* may configure the threshold time period for the UE 115-*a*. Upon shifting the first occasion of the first set of communication occasions, the UE 115-*a* may transmit an uplink communication 205. For example, the UE 115-*a* may communicate on the first occasion of the second set of communication occasions and on the first occasion of the first set of communication occasions.

Figure 3:
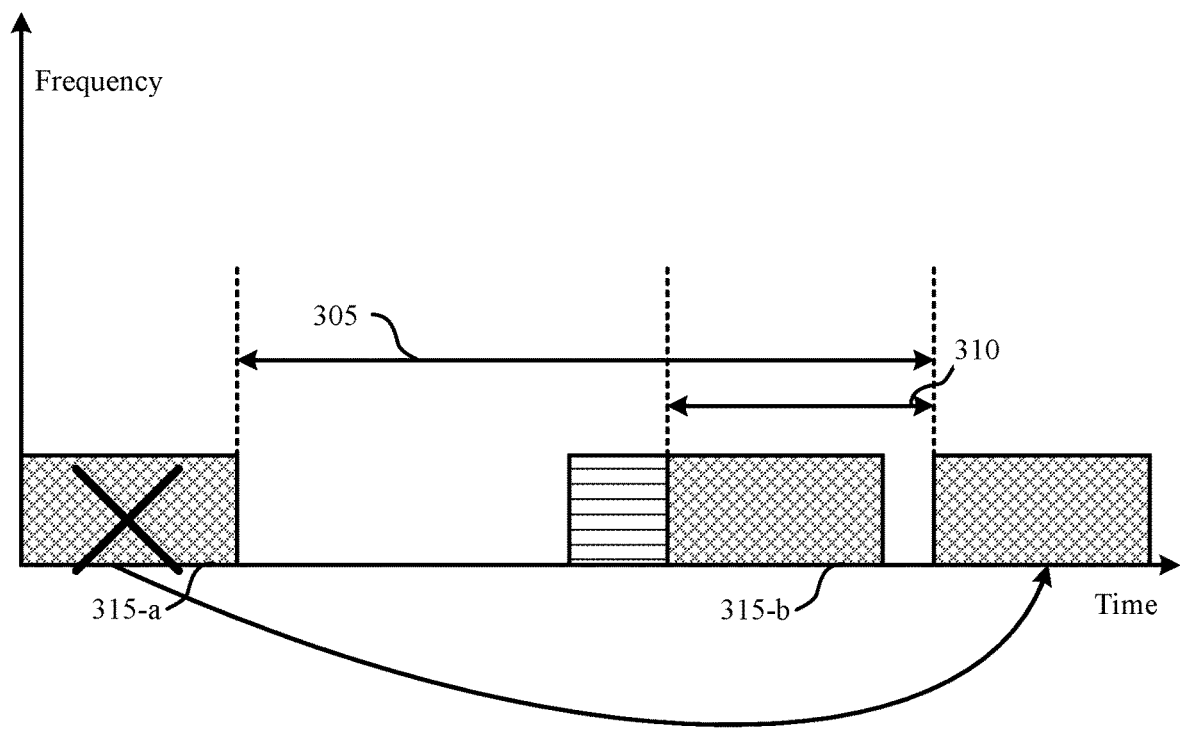
FIG. 3 illustrates an example of a communication timeline that supports techniques for aligning communications in accordance with one or more aspects of the present disclosure.
Figure 3:
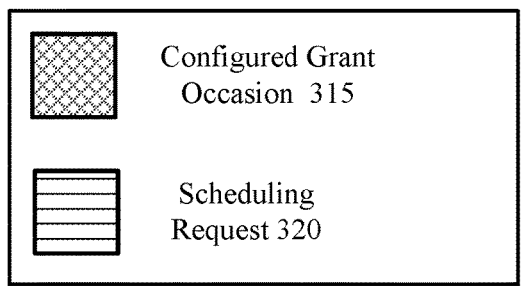

FIG. 3 illustrates an example of a communication timeline 300 that supports techniques for aligning communications in accordance with one or more aspects of the present disclosure. In some examples, the communication timeline 300 may implement aspects of the wireless communications system 100 or 200 or may be implemented by aspects of the wireless communications system 100. For example, a network entity 105 may transmit configured grants 315. The UE 115 may receive the configured grants 315 and the UE 115 may transmit a scheduling request 320 to shift one or more configured grant occasions. The network entity 105 and the UE 115 may be an example of corresponding devices described herein.

In some examples, the UE 115 may receive a first control signaling indicating a first set of communication occasions for periodic transmission or periodic reception in accordance with a first periodicity. The UE 115 may also receive second control signaling indicating a second set of communication occasions that differs in timing from the first set of communication occasions. The second set of communication occasions may differ in timing from the first set of communication occasions through a timing of the first occasion of the second set of communication occasions with respect to the first occasion of the first set of communication occasions or through a second periodicity for the second set of communication occasions with respect to the first periodicity.

As depicted in the example of FIG. 3, the UE 115 may receive a first control signaling scheduling a first configured grant occasion 315-*a* and the UE 115 may receive a second control signaling scheduling a second configured grant occasion 315-*b*. The UE 115 may determine that to cancel the first configured grant occasion 315-*a* and shift the configured grant occasion 315-*a* within a threshold time period 310 from the second configured grant occasion 315-*b*. The UE 115 may transmit an uplink message that is indicative that the UE 115 is to shift the first occasion 315-*a* of the first set of communication occasions to align the first occasion 315-*a* of the first set of communication occasions within the threshold time period. The uplink message may be a scheduling request that is not associated with a corresponding buffer status report. For instance, the UE 115 may cancel the first configured grant occasion 315-*a* and may send a special scheduling request 320 or another signal in the second period requesting the shift in the uplink resources. The UE 115 may not wait for a buffer status report prior to shifting the first configured grant occasion 315-*a*. For example, the uplink message transmitted by the UE 115 may be a scheduling request that includes a flag to distinguish the scheduling request from a legacy request associated with a buffer status report. The scheduling request 320 may include a flag requesting the network entity 105 to shift the previous cancelled first configured grant occasion 315-*a* (with same size) by a maximum of "T" (which can be RRC configured) to be aligned with the second configured grant occasion 315-*b*.

In some examples, the UE 115 may transmit the scheduling request 320 such that there are dedicated physical uplink control channel resources for the scheduling request 320. In some examples, the UE 115 may transmit an enhanced scheduling request 320 to be multiplexed with a configured grant physical uplink shared channel for this request. the enhanced scheduling request 320 may include a request for the network entity 105 to shift the previous cancelled configured grant occasion. For example, the UE 115 may transmit an indication of a time by which the first occasion of the second set of communication occasions is to be shifted. Additionally or alternatively, the UE 115 may transmit the uplink message in resources dedicated for indicating that the UE 115 is to shift the first occasion 315-*a* of the first set of communication occasions to align the first occasion 315-*b* of the first set of communication occasions within the threshold time period 310. In some cases, the uplink message (e.g., an uplink message including the scheduling request 320) may be multiplexed with a scheduled configured grant physical uplink shared channel message.

Upon receival of the scheduling request 320 (e.g., enhanced scheduling request), the network entity 105 may reallocate a configured grant. The new configured grant may be allocated "T" (e.g., a threshold time period 310) from the scheduling request 320 or a time period 305 from first configured grant occasion 315-*a*. In some examples, the UE 115 may shift the first occasion 315-*a* of the first set of communication occasions by a timing value with respect to a timing of an anchor configured grant transmission occasion. In some examples, the UE 115 may request for more resources in the next cycle using scheduling request 320. However, the latency incurred by scheduling request 320 may increase a delay of a packet making it absolute and thus bundling may not be realized.

Figure 4:
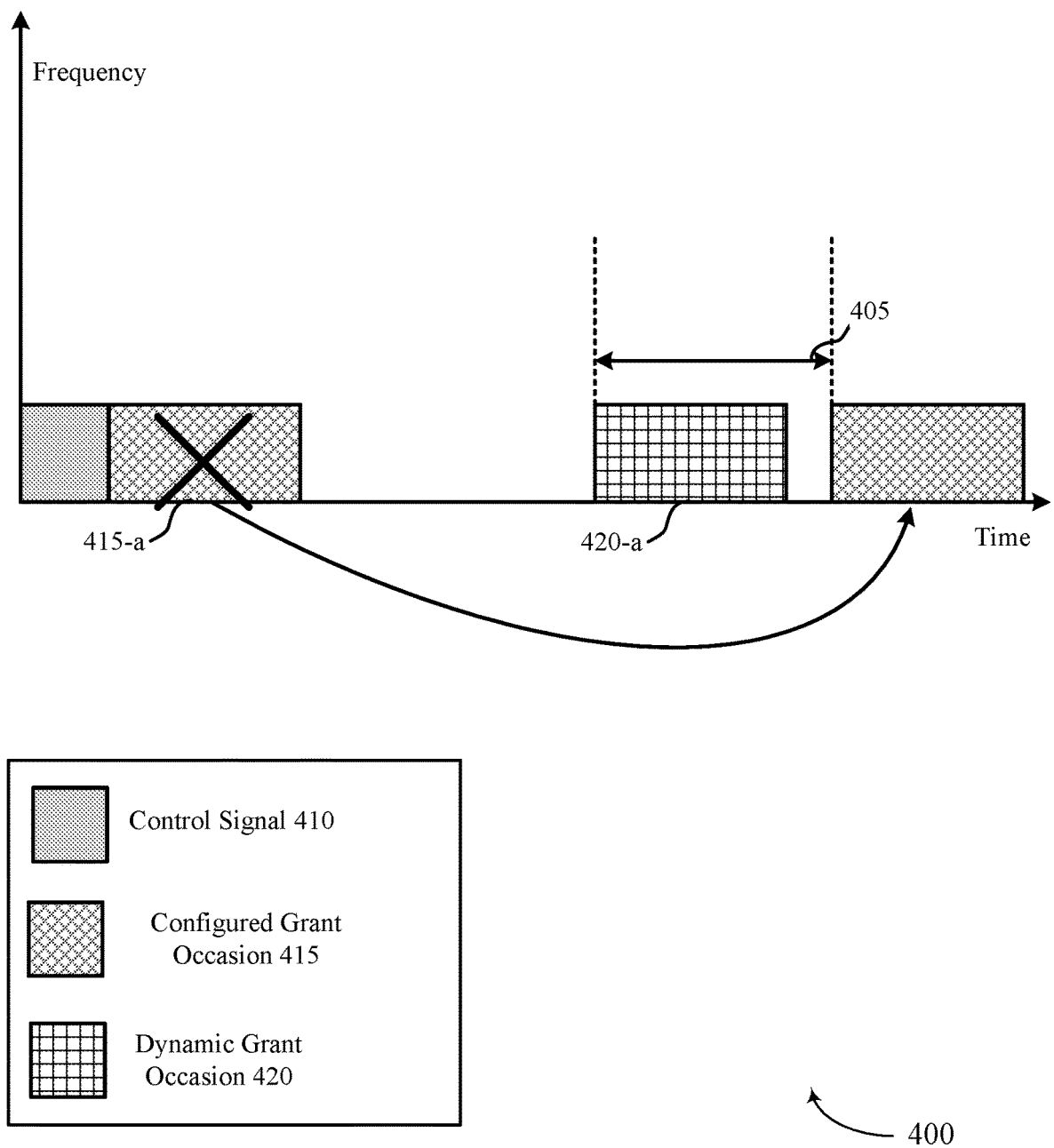
FIG. 4 illustrates an example of a communication timeline that supports techniques for aligning communications in accordance with one or more aspects of the present disclosure.

FIG. 4 illustrates an example of a communication timeline 400 that supports techniques for aligning communications in accordance with one or more aspects of the present disclosure. In some examples, the communication timeline 400 may implement aspects of the wireless communications system 100 or 200 or may be implemented by aspects of the wireless communications system 100. For example, a network entity 105 may transmit configured grants 415. The UE 115 may receive the configured grants 415 and the UE 115 may transmit receive a control signal 410 scheduling the configured grants 415. The network entity 105 and the UE 115 may be an example of corresponding devices described herein.

In some examples, the UE 115 may receive a first control signaling indicating a first set of communication occasions for periodic transmission or periodic reception in accordance with a first periodicity. The UE 115 may also receive second control signaling indicating a second set of communication occasions that differs in timing from the first set of communication occasions. The second set of communication occasions may differ in timing from the first set of communication occasions through a timing of the first occasion of the second set of communication occasions with respect to the first occasion of the first set of communication occasions or through a second periodicity for the second set of communication occasions with respect to the first periodicity.

As depicted in FIG. 4, the UE 115 and the network entity 105 may support alignment between configured grants and dynamic grants. For alignment between dynamic and configured activities, the configured activity may be aligned towards the dynamic activity. In some examples, the network entity 105 may explicitly indicate whether the alignment is allowed by physical downlink control channel either through a scheduling downlink control indication or a non-scheduling downlink control indication. The UE 115 may receive a control signal 410 including a downlink message that is indicative that the UE 115 is to shift the first occasion 415-*a* of the first set of communication occasions to align the first occasion 415-*a* of the first set of communication occasions within the threshold time duration 405. The downlink message may be one of a scheduling downlink control information message or a non-scheduling downlink control information message.

When the indication for alignment is received, the UE 115 may cancel the first occasion 415-*a* (e.g., the occasion on which the UE 115 initially wanted to transmit) of a configured grant (e.g., uplink pose or control) and may defer transmission to new transmit location which is aligned with a dynamic grant. The UE 115 may shift the first occasion 415-*a* within threshold time duration 405. In some examples, the UE 115 may shift the first occasion 415-*a* of the first set of communication occasions conditioned on the first occasion 415-*a* of the first set of communication occasions being at least a minimum time duration (e.g., threshold time duration 405), prior to shifting, after receipt of the downlink message (included in control signal 410). In some examples, the UE 115 may shift the first occasion 415-*a* of the first set of communication occasions conditioned on the first occasion 415-*a* of the first set of communication occasions being less than a maximum time duration before or after the first occasion 420-*a* (e.g., dynamic grant occasion 420) of the second set of communication occasions. For instance, there may be a minimum time duration for the UE 115 to cancel the transmission on the first occasion 415-*a* (e.g., configured grant transmission) and change the transmit location for the alignment. Additionally or alternatively, there may be a maximum duration for the UE 115 to check from the configured grant from the dynamic grant location. Upon receiving an alignment indication in the downlink control information (e.g., control signal 410) scheduling the dynamic grant, the UE 115 may defer the configured grant transmission to a new configured grant at time offset "T" (e.g., threshold time duration 405) from the dynamic grant (corresponding to the first occasion 420-*a* of the second set of communication occasions).

In some examples, the network entity 105 may use dynamic triggering offset to align the configured activity towards the dynamic activity in the physical downlink control channel. For alignment with dynamic grants, the network entity 105 may use a single downlink control information scheduling multiple allocations. The UE 115 may receive a single downlink control information message that schedules multiple resource allocations for uplink transmissions. In some examples, the UE 115 may select one of the multiple resource allocations as the first occasion of the second set of communication occasions. In some cases, the selection may be based on a timing proximity of the first occasion of the first set of communication occasions with individual ones of the multiple resource allocations. For instance, the single downlink control information (e.g., control signal 410) may schedule a first time domain resource allocation. In such cases, the UE 115 may determine a second time domain resource allocation based on the first time domain resource allocation and an offset. the network entity 105 may indicate the offset to the UE 115. The UE 115 may use either of the time domain resource allocations to transmit an uplink packet. If the UE 115 used the first time domain resource allocation, then the second allocation may not be assumed to be used by UE 115.

In some examples, the first set of communication occasions may be associated with a first semi-persistent scheduling configuration, and the second set of communication occasions may be associated with a connected mode discontinuous reception (CDRX) configuration. The UE 115 may be configured with semi-persistent scheduling for a first communication flow (e.g., audio traffic) and with CDRX for a second communication flow (e.g., video traffic). In this example, the first communication flow and the second communication flow may have different periods. The UE 115 may be configured with tentative semi-persistent scheduling, with the same period as CDRX, and close to an on duration.

In some examples, the UE 115 may monitor for a wake up signal, where failure to detect the wake up signal triggers the shifting of the first occasion of the first set of communication occasions. The network entity 105 may or may not send the audio data on a first occasion of the semi-persistent scheduling, and the network entity 105 may signal the upcoming communication to the UE 115 through a wake-up signal. When the first occasion of the semi-persistent scheduling is upcoming, the UE 115 may decode the wake-up signal. If the wake-up signal indicates a wake up, then the UE 115 may determine that there is an upcoming transmission on the first occasion of the semi-persistent scheduling. That is, the UE 115 wakes up to receive audio data on the first occasion of the semi-persistent scheduling. If the wake up signal does not signal a wake up, this means that there is no upcoming data on the first occasion of the semi-persistent scheduling. In such cases, the UE 115 may not wake up to receive the first occasion of the semi-persistent scheduling. The UE 115 may wake up at the next on duration and receive the tentative semi-persistent scheduling, to receive the data.

Figure 5:
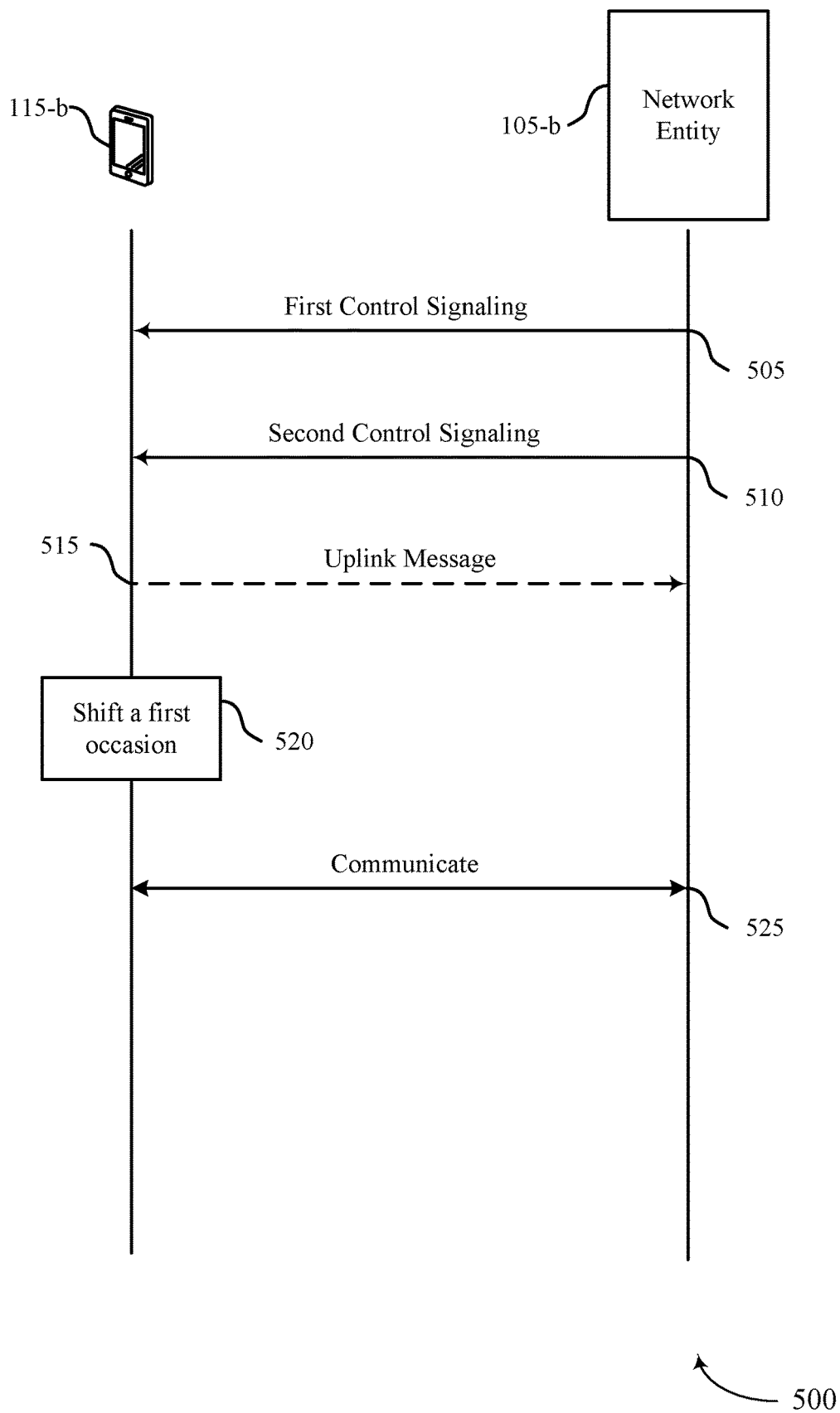
FIG. 5 illustrates an example of a process flow that supports techniques for aligning communications in accordance with one or more aspects of the present disclosure.

FIG. 5 illustrates an example of a process flow 500 that supports techniques for aligning communications in accordance with one or more aspects of the present disclosure. In some examples, the process flow 500 may implement aspects of the wireless communications system 100 or 200 or may be implemented by aspects of the wireless communications system 100 or 200. For example, the process flow 500 may include a UE 115-b and a network entity 105-b, which may be examples of corresponding devices described herein.

At 505, the UE 115-b may receive, from the network entity 105-b, first control signaling indicating a first set of communication occasions for periodic transmission or periodic reception in accordance with a first periodicity.

At 510, the UE 115-b may receive, from the network entity 105-b, second control signaling indicating a second set of communication occasions that differs in timing from the first set of communication occasions. In some examples, the first set of communication occasions may be associated with a first configured grant, and the second set of communication occasions may be associated with a second configured grant. In some examples, the first set of communication occasions may be associated with a configured grant, and the second set of communication occasions may be associated with a dynamic grant. In some examples, the second set of communication occasions differs in timing from the first set of communication occasions through a timing of the first occasion of the second set of communication occasions with respect to the first occasion of the first set of communication occasions or through a second periodicity for the second set of communication occasions with respect to the first periodicity.

At 515, in some examples, the UE 115-b may optionally transmit an uplink message that is indicative that the UE 115-b is to shift the first occasion of the first set of communication occasions to align the first occasion of the first set of communication occasions within the threshold time period. In some cases, the uplink message may be a scheduling request that is not associated with a corresponding buffer status report. Additionally or alternatively, the uplink message is a scheduling request that includes a flag to distinguish the scheduling request from a legacy request associated with a buffer status report.

At 520, the UE 115-b may shift a first occasion of the first set of communication occasions to align the first occasion of the first set of communication occasions within a threshold time period from a first occasion of the second set of communication occasions.

At 525, the UE 115-b and the network entity 105-b may communicate on the first occasion of the second set of communication occasions and on the first occasion of the first set of communication occasions.

Figure 6:
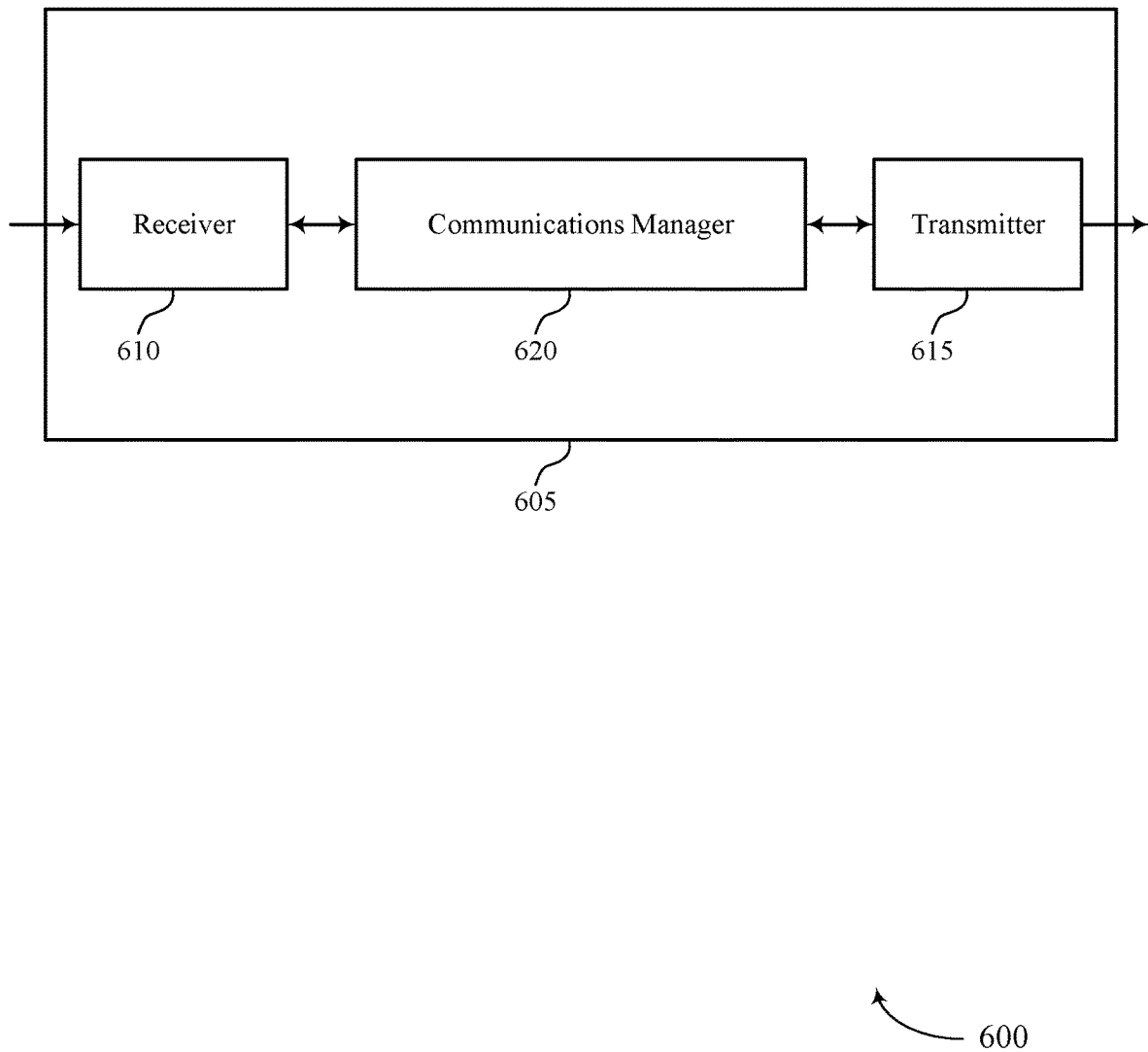
FIGS. 6 and 7 illustrate block diagrams of devices that support techniques for aligning communications in accordance with one or more aspects of the present disclosure.

FIG. 6 illustrates a block diagram 600 of a device 605 that supports techniques for aligning communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for aligning communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for aligning communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for aligning communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving first control signaling indicating a first set of communication occasions for periodic transmission or periodic reception in accordance with a first periodicity. The communications manager 620 may be configured as or otherwise support a means for receiving second control signaling indicating a second set of communication occasions that differs in timing from the first set of communication occasions. The communications manager 620 may be configured as or otherwise support a means for shifting a first occasion of the first set of communication occasions to align the first occasion of the first set of communication occasions within a threshold time period from a first occasion of the second set of communication occasions. The communications manager 620 may be configured as or otherwise support a means for communicating on the first occasion of the second set of communication occasions and on the first occasion of the first set of communication occasions.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
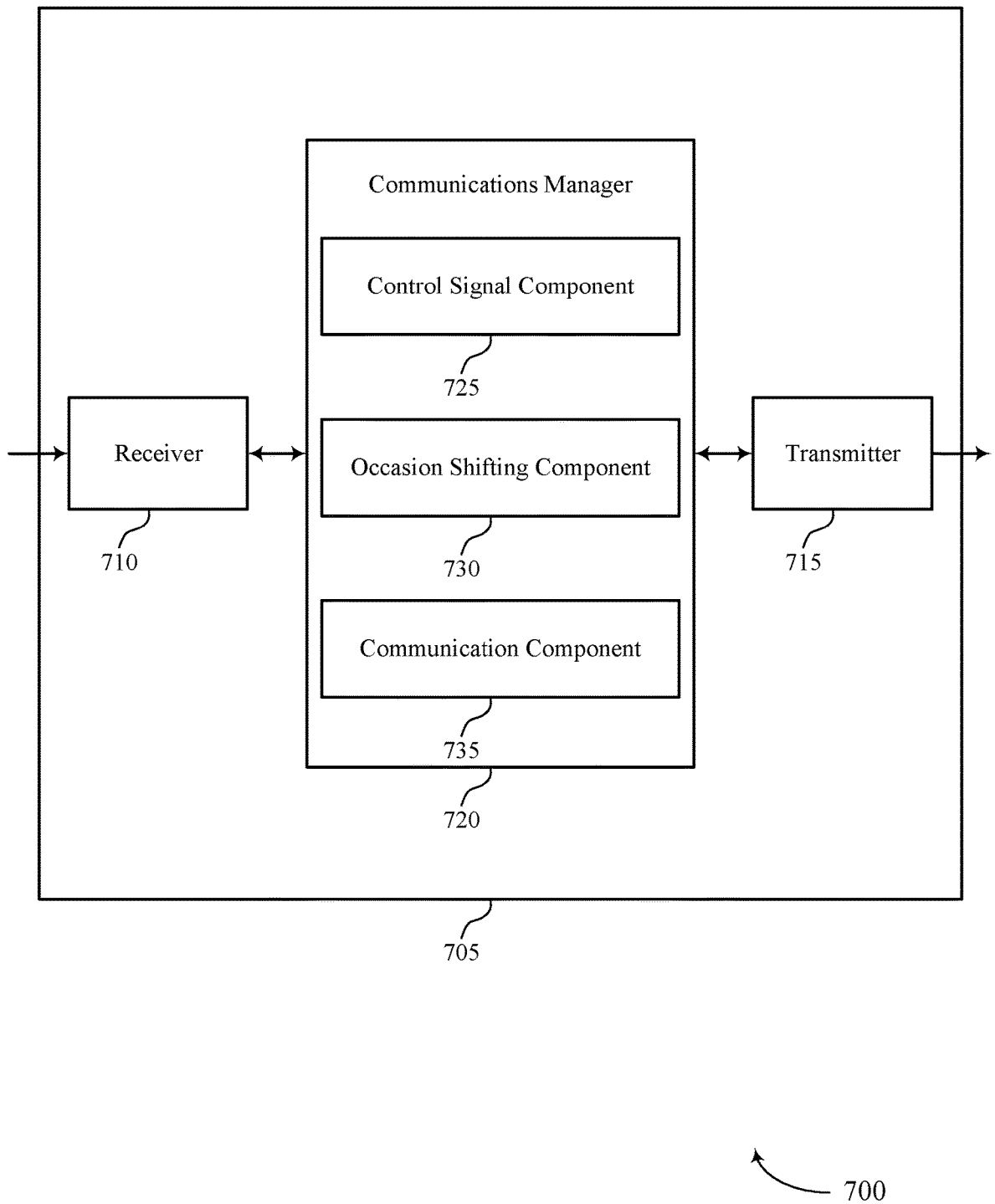

FIG. 7 illustrates a block diagram 700 of a device 705 that supports techniques for aligning communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for aligning communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for aligning communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for aligning communications as described herein. For example, the communications manager 720 may include a control signal component 725, an occasion shifting component 730, a communication component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The control signal component 725 may be configured as or otherwise support a means for receiving first control signaling indicating a first set of communication occasions for periodic transmission or periodic reception in accordance with a first periodicity. The control signal component 725 may be configured as or otherwise support a means for receiving second control signaling indicating a second set of communication occasions that differs in timing from the first set of communication occasions. The occasion shifting component 730 may be configured as or otherwise support a means for shifting a first occasion of the first set of communication occasions to align the first occasion of the first set of communication occasions within a threshold time period from a first occasion of the second set of communication occasions. The communication component 735 may be configured as or otherwise support a means for communicating on the first occasion of the second set of communication occasions and on the first occasion of the first set of communication occasions.

Figure 8:
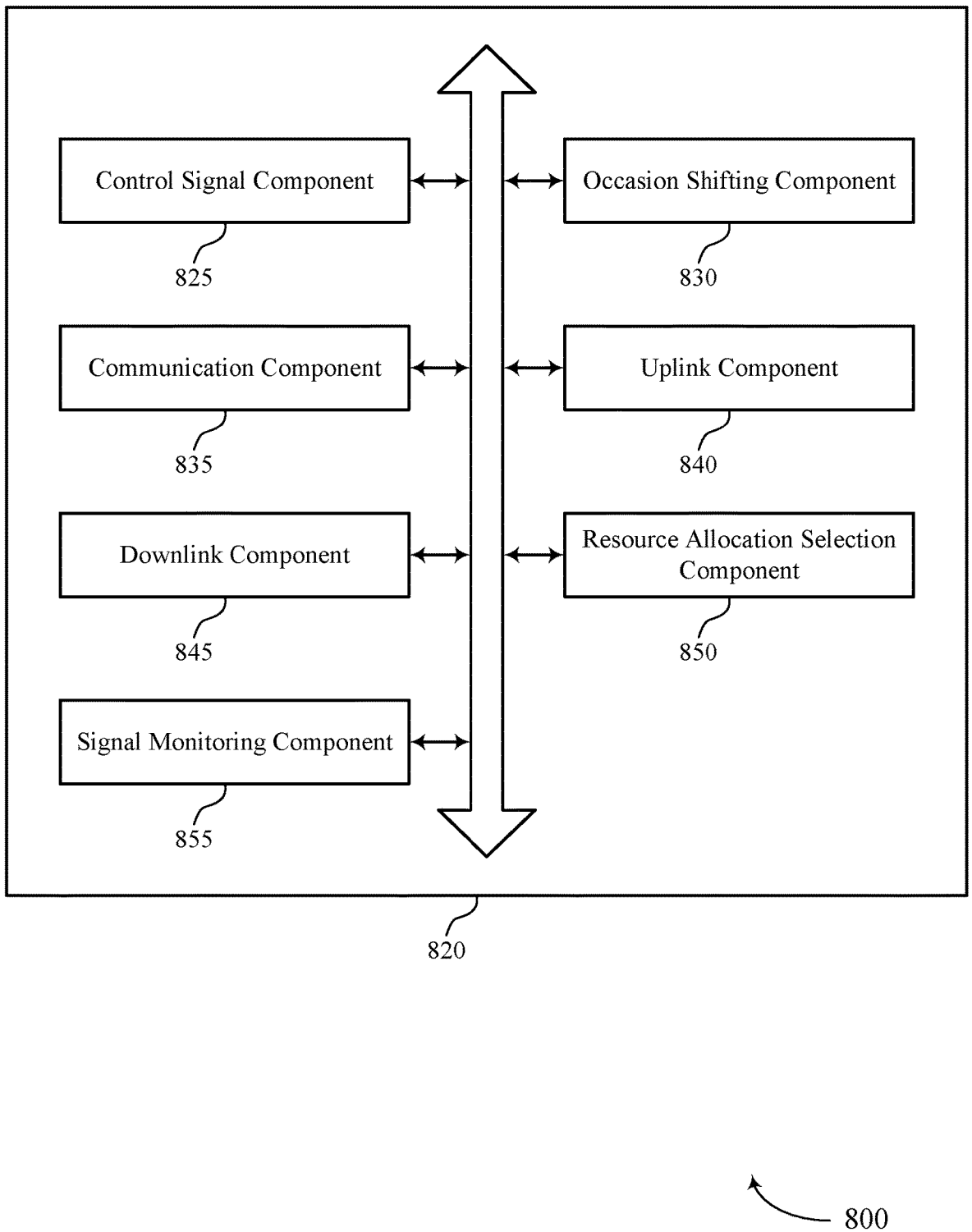
FIG. 8 illustrates a block diagram of a communications manager that supports techniques for aligning communications in accordance with one or more aspects of the present disclosure.

FIG. 8 illustrates a block diagram 800 of a communications manager 820 that supports techniques for aligning communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for aligning communications as described herein. For example, the communications manager 820 may include a control signal component 825, an occasion shifting component 830, a communication component 835, an uplink component 840, a downlink component 845, a resource allocation selection component 850, a signal monitoring component 855, or any combination thereof. Each of these components may communicate, directly or indirectly, with one another (e.g., via one or more buses).

The communications manager 820 may support wireless communication at a UE in accordance with examples as disclosed herein. The control signal component 825 may be configured as or otherwise support a means for receiving first control signaling indicating a first set of communication occasions for periodic transmission or periodic reception in accordance with a first periodicity. In some examples, the control signal component 825 may be configured as or otherwise support a means for receiving second control signaling indicating a second set of communication occasions that differs in timing from the first set of communication occasions. The occasion shifting component 830 may be configured as or otherwise support a means for shifting a first occasion of the first set of communication occasions to align the first occasion of the first set of communication occasions within a threshold time period from a first occasion of the second set of communication occasions. The communication component 835 may be configured as or otherwise support a means for communicating on the first occasion of the second set of communication occasions and on the first occasion of the first set of communication occasions.

In some examples, the second set of communication occasions differs in timing from the first set of communication occasions through a timing of the first occasion of the second set of communication occasions with respect to the first occasion of the first set of communication occasions or through a second periodicity for the second set of communication occasions with respect to the first periodicity.

In some examples, the uplink component 840 may be configured as or otherwise support a means for transmitting an uplink message that is indicative that the UE is to shift the first occasion of the first set of communication occasions to align the first occasion of the first set of communication occasions within the threshold time period.

In some examples, the uplink message is a scheduling request that is not associated with a corresponding buffer status report.

In some examples, the uplink message is a scheduling request that includes a flag to distinguish the scheduling request from a legacy request associated with a buffer status report.

In some examples, to support transmitting the uplink message, the uplink component 840 may be configured as or otherwise support a means for transmitting an indication of a time by which the first occasion of the second set of communication occasions is to be shifted.

In some examples, to support transmitting the uplink message, the uplink component 840 may be configured as or otherwise support a means for transmitting the uplink message in resources dedicated for indicating that the UE is to shift the first occasion of the first set of communication occasions to align the first occasion of the first set of communication occasions within the threshold time period.

In some examples, to support transmitting the uplink message, the uplink component 840 may be configured as or otherwise support a means for transmitting the uplink message multiplexed with a scheduled configured grant physical uplink shared channel message.

In some examples, to support shifting the first occasion of the first set of communication occasions, the occasion shifting component 830 may be configured as or otherwise support a means for shifting the first occasion of the first set of communication occasions by a timing value with respect to a transmission time of the uplink message.

In some examples, to support shifting the first occasion of the first set of communication occasions, the occasion shifting component 830 may be configured as or otherwise support a means for shifting the first occasion of the first set of communication occasions by a timing value with respect to a timing of an anchor configured grant transmission occasion.

In some examples, the downlink component 845 may be configured as or otherwise support a means for receiving a downlink message that is indicative that the UE is to shift the first occasion of the first set of communication occasions to align the first occasion of the first set of communication occasions within the threshold time period.

In some examples, the downlink message is one of a scheduling downlink control information message or a non-scheduling downlink control information message. In some examples, shifting the first occasion of the first set of communication occasions is conditioned on the first occasion of the first set of communication occasions being at least a minimum time duration, prior to shifting, after receipt of the downlink message.

In some examples, shifting the first occasion of the first set of communication occasions is conditioned on the first occasion of the first set of communication occasions being less than a maximum time duration before or after the first occasion of the second set of communication occasions. In some examples, the downlink message includes a dynamic triggering offset indicating an amount of time the first occasion of the first set of communication occasions is to be shifted.

In some examples, the downlink component 845 may be configured as or otherwise support a means for receiving a single downlink control information message that schedules multiple resource allocations for uplink transmissions. In some examples, the resource allocation selection component 850 may be configured as or otherwise support a means for selecting one of the multiple resource allocations as the first occasion of the second set of communication occasions, the selection based on a timing proximity of the first occasion of the first set of communication occasions with individual ones of the multiple resource allocations.

In some examples, the first set of communication occasions is associated with a first configured grant. In some examples, the second set of communication occasions is associated with a second configured grant. In some examples, the first set of communication occasions is associated with a configured grant. In some examples, the second set of communication occasions is associated with a dynamic grant.

In some examples, the first set of communication occasions is associated with a first semi-persistent scheduling configuration, and the signal monitoring component 855 may be configured as or otherwise support a means for monitoring for a wake up signal, where failure to detect the wake up signal triggers the shifting of the first occasion of the first set of communication occasions.

Figure 9:
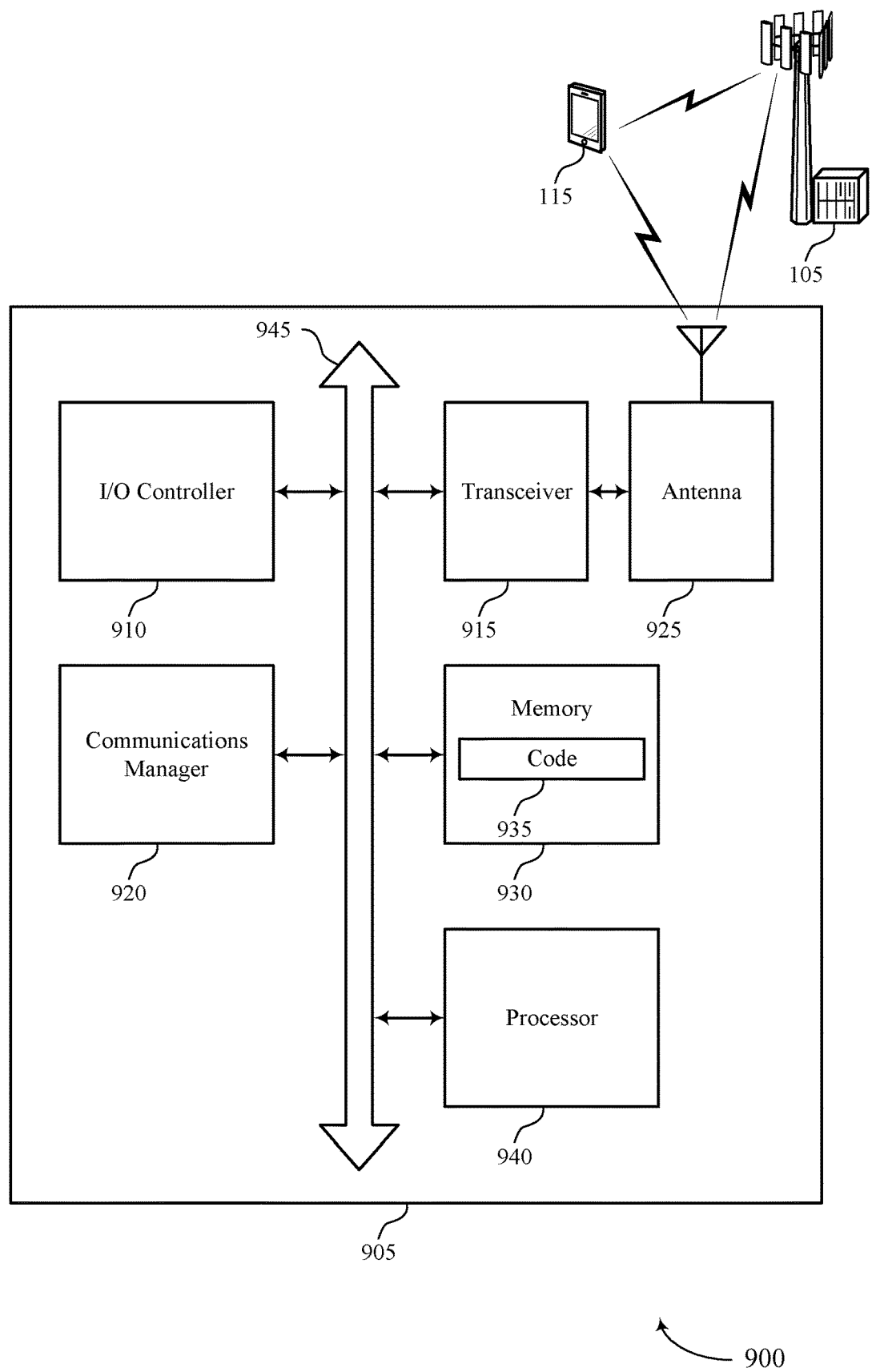
FIG. 9 illustrates a diagram of a system including a device that supports techniques for aligning communications in accordance with one or more aspects of the present disclosure.

FIG. 9 illustrates a diagram of a system 900 including a device 905 that supports techniques for aligning communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for aligning communications). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving first control signaling indicating a first set of communication occasions for periodic transmission or periodic reception in accordance with a first periodicity. The communications manager 920 may be configured as or otherwise support a means for receiving second control signaling indicating a second set of communication occasions that differs in timing from the first set of communication occasions. The communications manager 920 may be configured as or otherwise support a means for shifting a first occasion of the first set of communication occasions to align the first occasion of the first set of communication occasions within a threshold time period from a first occasion of the second set of communication occasions. The communications manager 920 may be configured as or otherwise support a means for communicating on the first occasion of the second set of communication occasions and on the first occasion of the first set of communication occasions.

By including or configuring the communications manager 920 in accordance with examples as described herein, the device 905 may support techniques for improved communication reliability, reduced latency, improved user experience related to reduced processing, reduced power consumption, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for aligning communications as described herein, or the processor 940 and the memory 930 may be otherwise configured to perform or support such operations.

Figure 10:
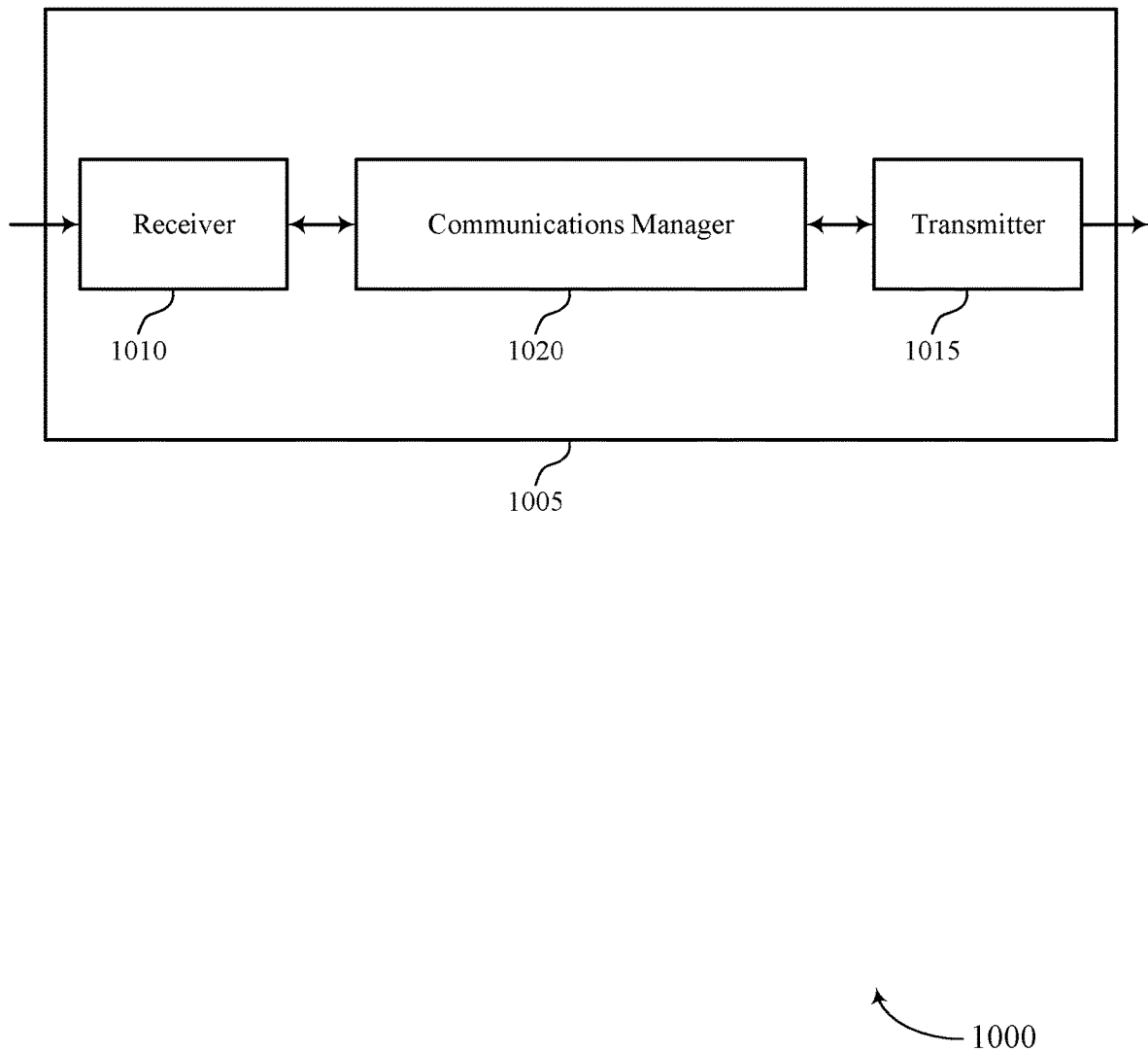
FIGS. 10 and 11 illustrate block diagrams of devices that support techniques for aligning communications in accordance with one or more aspects of the present disclosure.

FIG. 10 illustrates a block diagram 1000 of a device 1005 that supports techniques for aligning communications in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for aligning communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting, to a UE first control signaling indicating a first set of communication occasions for periodic transmission or periodic reception in accordance with a first periodicity. The communications manager 1020 may be configured as or otherwise support a means for transmitting, to the UE, second control signaling indicating a second set of communication occasions that differs in timing from the first set of communication occasions. The communications manager 1020 may be configured as or otherwise support a means for communicating on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
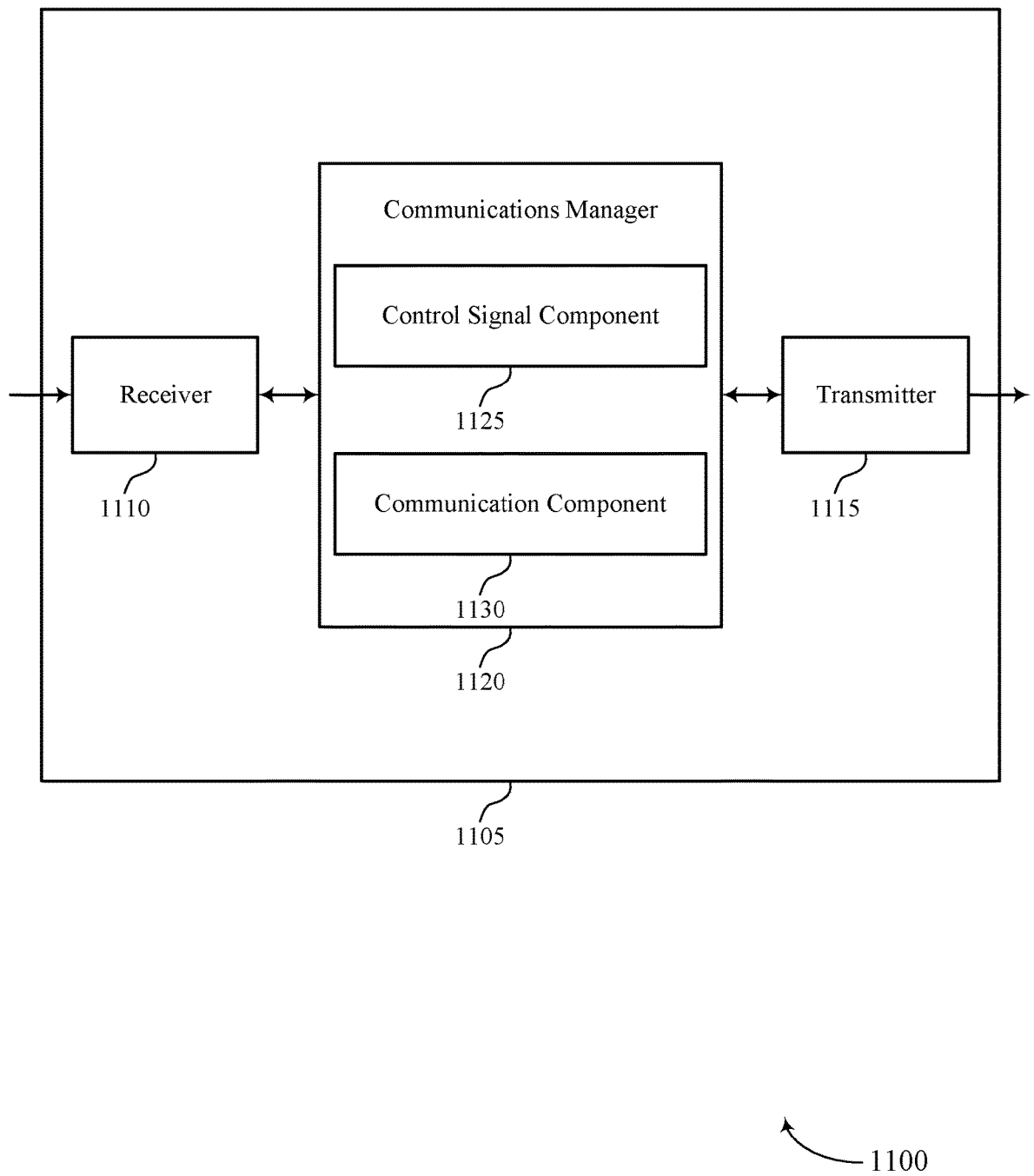

FIG. 11 illustrates a block diagram 1100 of a device 1105 that supports techniques for aligning communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for aligning communications as described herein. For example, the communications manager 1120 may include a control signal component 1125 a communication component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The control signal component 1125 may be configured as or otherwise support a means for transmitting, to a UE first control signaling indicating a first set of communication occasions for periodic transmission or periodic reception in accordance with a first periodicity. The control signal component 1125 may be configured as or otherwise support a means for transmitting, to the UE, second control signaling indicating a second set of communication occasions that differs in timing from the first set of communication occasions. The communication component 1130 may be configured as or otherwise support a means for communicating on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions.

Figure 12:
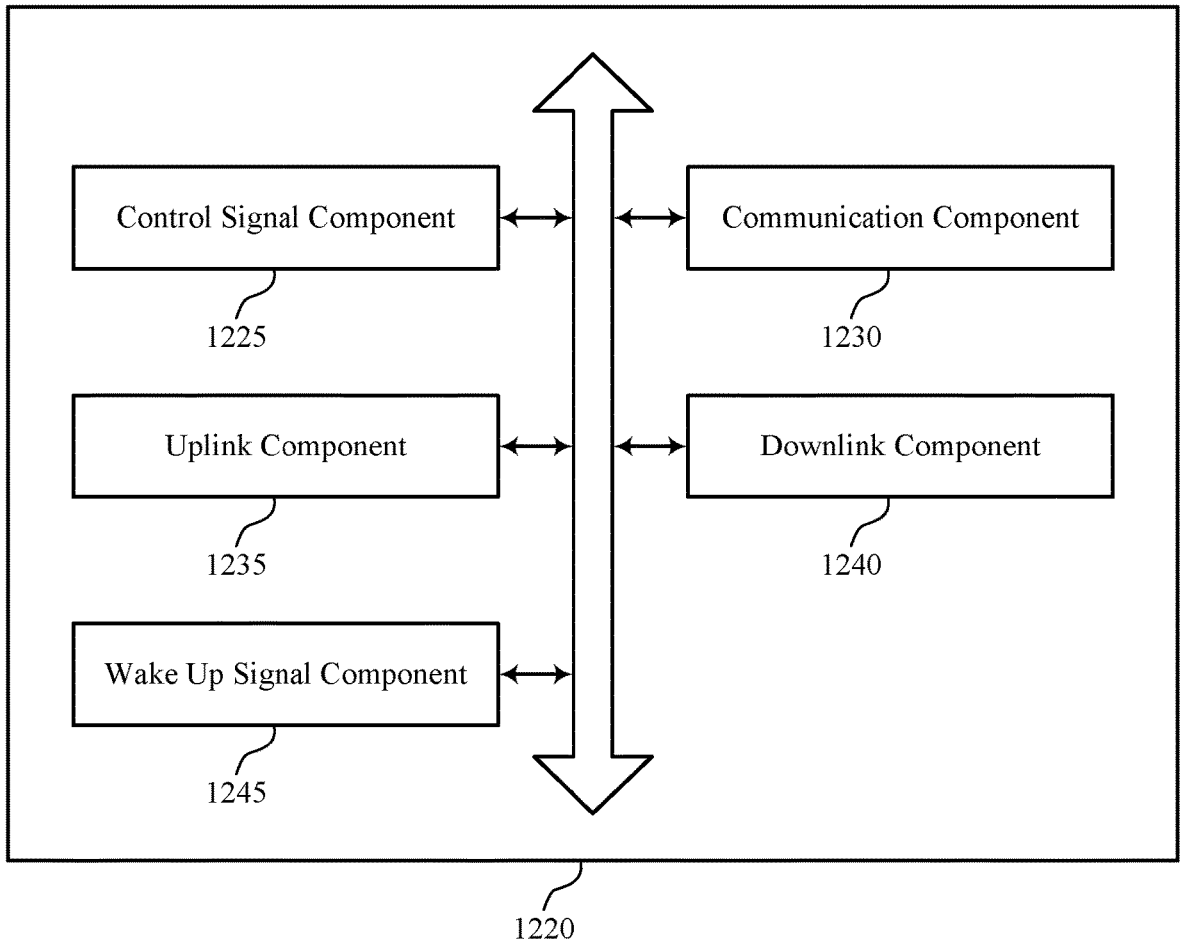
FIG. 12 illustrates a block diagram of a communications manager that supports techniques for aligning communications in accordance with one or more aspects of the present disclosure.

FIG. 12 illustrates a block diagram 1200 of a communications manager 1220 that supports techniques for aligning communications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for aligning communications as described herein. For example, the communications manager 1220 may include a control signal component 1225, a communication component 1230, an uplink component 1235, a downlink component 1240, a wake up signal component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The control signal component 1225 may be configured as or otherwise support a means for transmitting, to a UE first control signaling indicating a first set of communication occasions for periodic transmission or periodic reception in accordance with a first periodicity. In some examples, the control signal component 1225 may be configured as or otherwise support a means for transmitting, to the UE, second control signaling indicating a second set of communication occasions that differs in timing from the first set of communication occasions. The communication component 1230 may be configured as or otherwise support a means for communicating on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions.

In some examples, the second set of communication occasions differs in timing from the first set of communication occasions through a timing of the first occasion of the second set of communication occasions with respect to the first occasion of the first set of communication occasions or through a second periodicity for the second set of communication occasions with respect to the first periodicity.

In some examples, the uplink component 1235 may be configured as or otherwise support a means for receiving an uplink message that is indicative that the UE is to shift the first occasion of the first set of communication occasions to align the first occasion of the first set of communication occasions within the threshold time period.

In some examples, the uplink message is a scheduling request that is not associated with a corresponding buffer status report. In some examples, the uplink message is a scheduling request that includes a flag to distinguish the scheduling request from a legacy request associated with a buffer status report.

In some examples, to support receiving the uplink message, the uplink component 1235 may be configured as or otherwise support a means for receiving an indication of a time by which the first occasion of the second set of communication occasions is to be shifted.

In some examples, to support receiving the uplink message, the uplink component 1235 may be configured as or otherwise support a means for receiving the uplink message in resources dedicated for indicating that the UE is to shift the first occasion of the first set of communication occasions to align the first occasion of the first set of communication occasions within the threshold time period.

In some examples, to support receiving the uplink message, the uplink component 1235 may be configured as or otherwise support a means for receiving the uplink message multiplexed with a scheduled configured grant physical uplink shared channel message.

In some examples, the UE shifts the first occasion of the first set of communication occasions by a timing value with respect to a transmission time of the uplink message. In some examples, the UE shifts the first occasion of the first set of communication occasions by a timing value with respect to a timing of an anchor configured grant transmission occasion.

In some examples, the downlink component 1240 may be configured as or otherwise support a means for transmitting a downlink message that is indicative that the UE is to shift the first occasion of the first set of communication occasions to align the first occasion of the first set of communication occasions within the threshold time period.

In some examples, the downlink message is one of a scheduling downlink control information message or a non-scheduling downlink control information message.

In some examples, shifting of the first occasion of the first set of communication occasions is conditioned on the first occasion of the first set of communication occasions being at least a minimum time duration, prior to shifting, after receipt of the downlink message.

In some examples, shifting of the first occasion of the first set of communication occasions is conditioned on the first occasion of the first set of communication occasions being less than a maximum time duration before or after the first occasion of the second set of communication occasions. In some examples, the downlink message includes a dynamic triggering offset indicating an amount of time the first occasion of the first set of communication occasions is to be shifted.

In some examples, the downlink component 1240 may be configured as or otherwise support a means for transmitting a single downlink control information message that schedules multiple resource allocations for uplink transmissions, where one of the multiple resource allocations is selected as the first occasion of the second set of communication occasions based on a timing proximity of the first occasion of the first set of communication occasions with individual ones of the multiple resource allocations.

In some examples, the first set of communication occasions is associated with a first configured grant. In some examples, the second set of communication occasions is associated with a second configured grant. In some examples, the first set of communication occasions is associated with a configured grant. In some examples, the second set of communication occasions is associated with a dynamic grant.

In some examples, the first set of communication occasions is associated with a first semi-persistent scheduling configuration, and the wake up signal component 1245 may be configured as or otherwise support a means for transmitting a wake up signal, where refraining from transmitting the wake up signal triggers the shifting of the first occasion of the first set of communication occasions.

Figure 13:
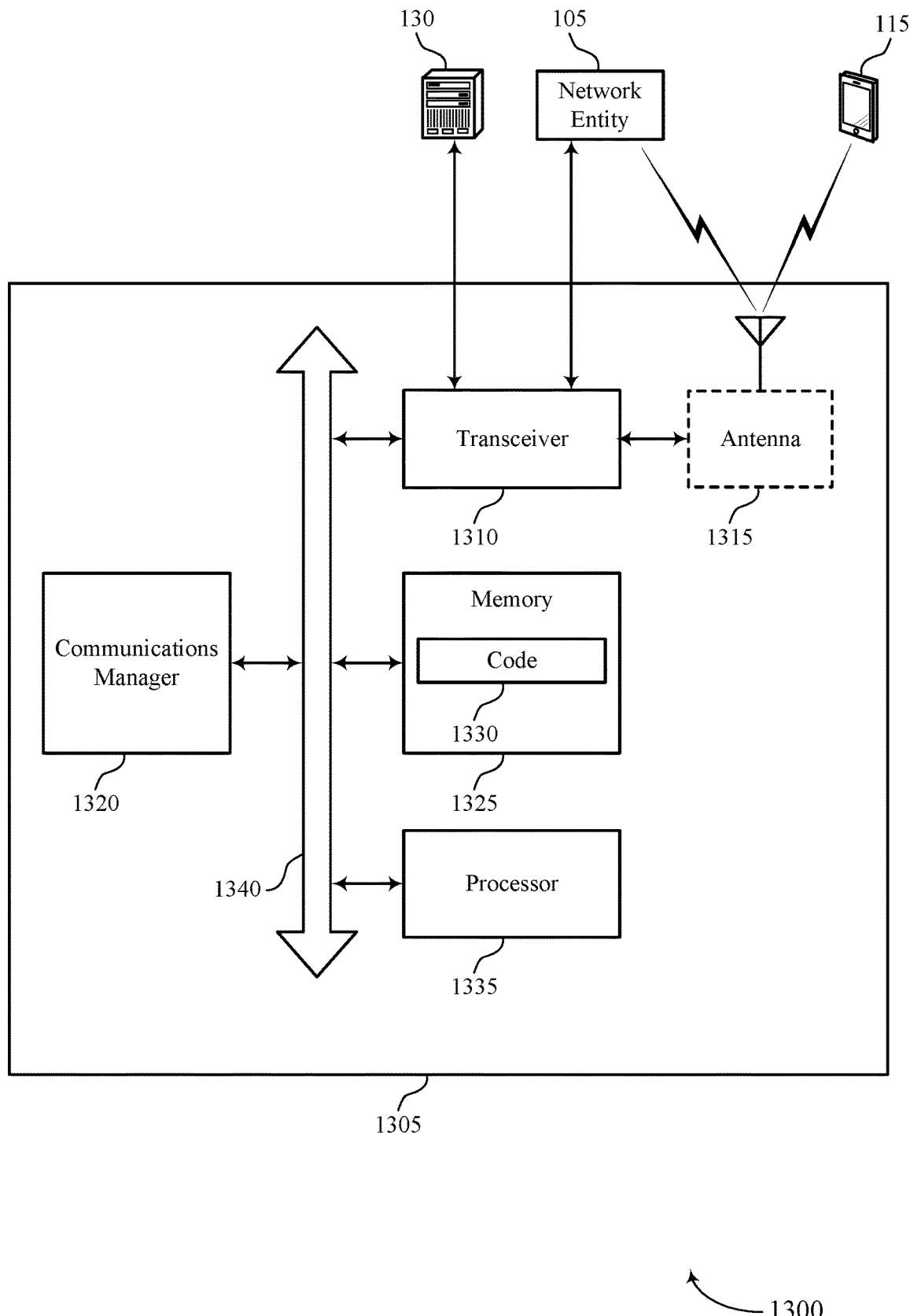
FIG. 13 illustrates a diagram of a system including a device that supports techniques for aligning communications in accordance with one or more aspects of the present disclosure.

FIG. 13 illustrates a diagram of a system 1300 including a device 1305 that supports techniques for aligning communications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for aligning communications). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting, to a UE first control signaling indicating a first set of communication occasions for periodic transmission or periodic reception in accordance with a first periodicity. The communications manager 1320 may be configured as or otherwise support a means for transmitting, to the UE, second control signaling indicating a second set of communication occasions that differs in timing from the first set of communication occasions. The communications manager 1320 may be configured as or otherwise support a means for communicating on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions.

By including or configuring the communications manager 1320 in accordance with examples as described herein, the device 1305 may support techniques for improved communication reliability, reduced latency, improved user experience related to reduced processing, reduced power consumption, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for aligning communications as described herein, or the processor 1335 and the memory 1325 may be otherwise configured to perform or support such operations.

Figure 14:
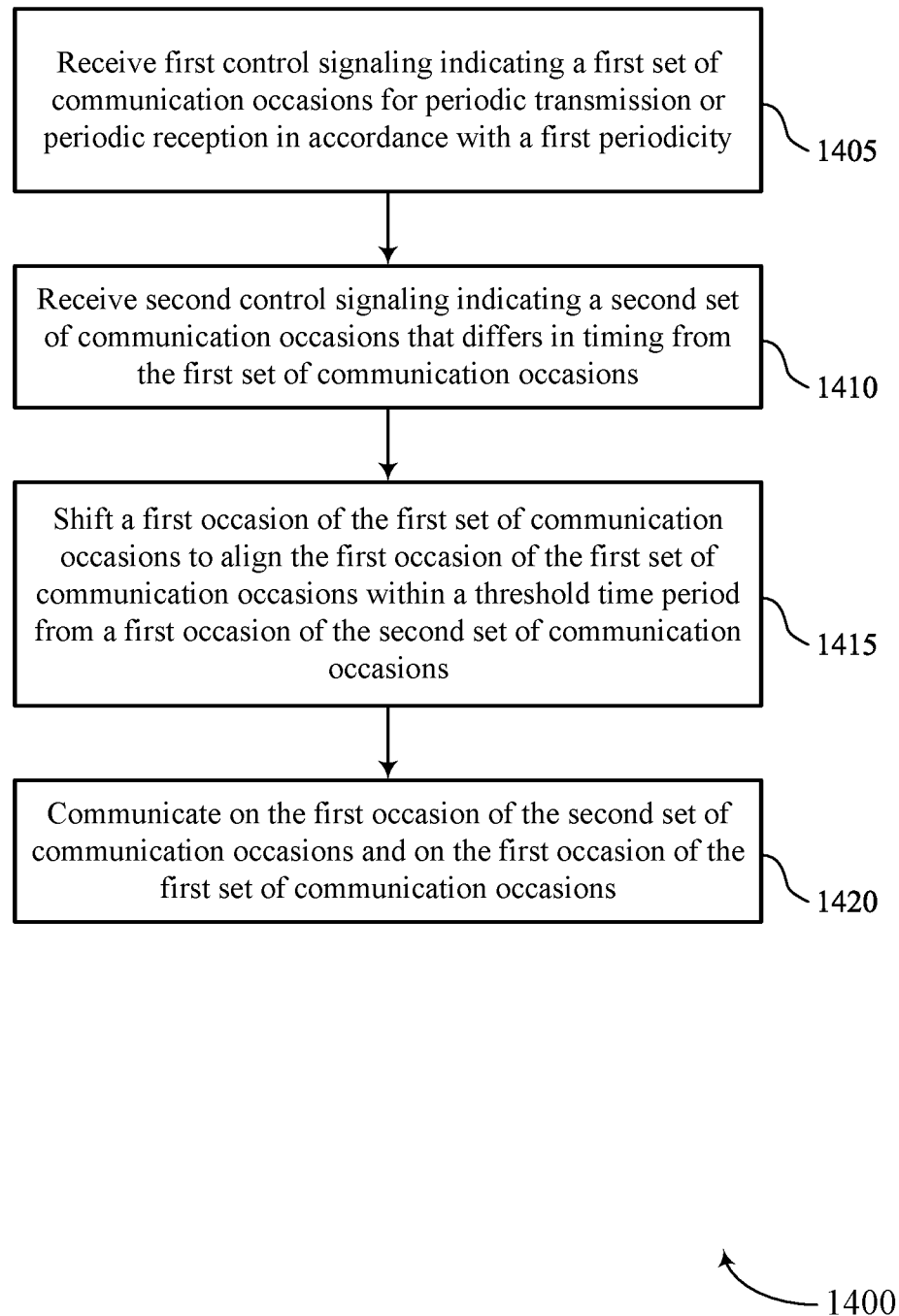
FIGS. 14 through 17 illustrate flowcharts showing methods that support techniques for aligning communications in accordance with one or more aspects of the present disclosure.

FIG. 14 illustrates a flowchart showing a method 1400 that supports techniques for aligning communications in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving first control signaling indicating a first set of communication occasions for periodic transmission or periodic reception in accordance with a first periodicity. The operations of 1405 may be performed in accordance with examples as disclosed herein. In some examples, aspects of the operations of 1405 may be performed by a control signal component 825 as described with reference to FIG. 8.

At 1410, the method may include receiving second control signaling indicating a second set of communication occasions that differs in timing from the first set of communication occasions. The operations of 1410 may be performed in accordance with examples as disclosed herein. In some examples, aspects of the operations of 1410 may be performed by a control signal component 825 as described with reference to FIG. 8.

At 1415, the method may include shifting a first occasion of the first set of communication occasions to align the first occasion of the first set of communication occasions within a threshold time period from a first occasion of the second set of communication occasions. The operations of 1415 may be performed in accordance with examples as disclosed herein. In some examples, aspects of the operations of 1415 may be performed by an occasion shifting component 830 as described with reference to FIG. 8.

At 1420, the method may include communicating on the first occasion of the second set of communication occasions and on the first occasion of the first set of communication occasions. The operations of 1420 may be performed in accordance with examples as disclosed herein. In some examples, aspects of the operations of 1420 may be performed by a communication component 835 as described with reference to FIG. 8.

Figure 15:
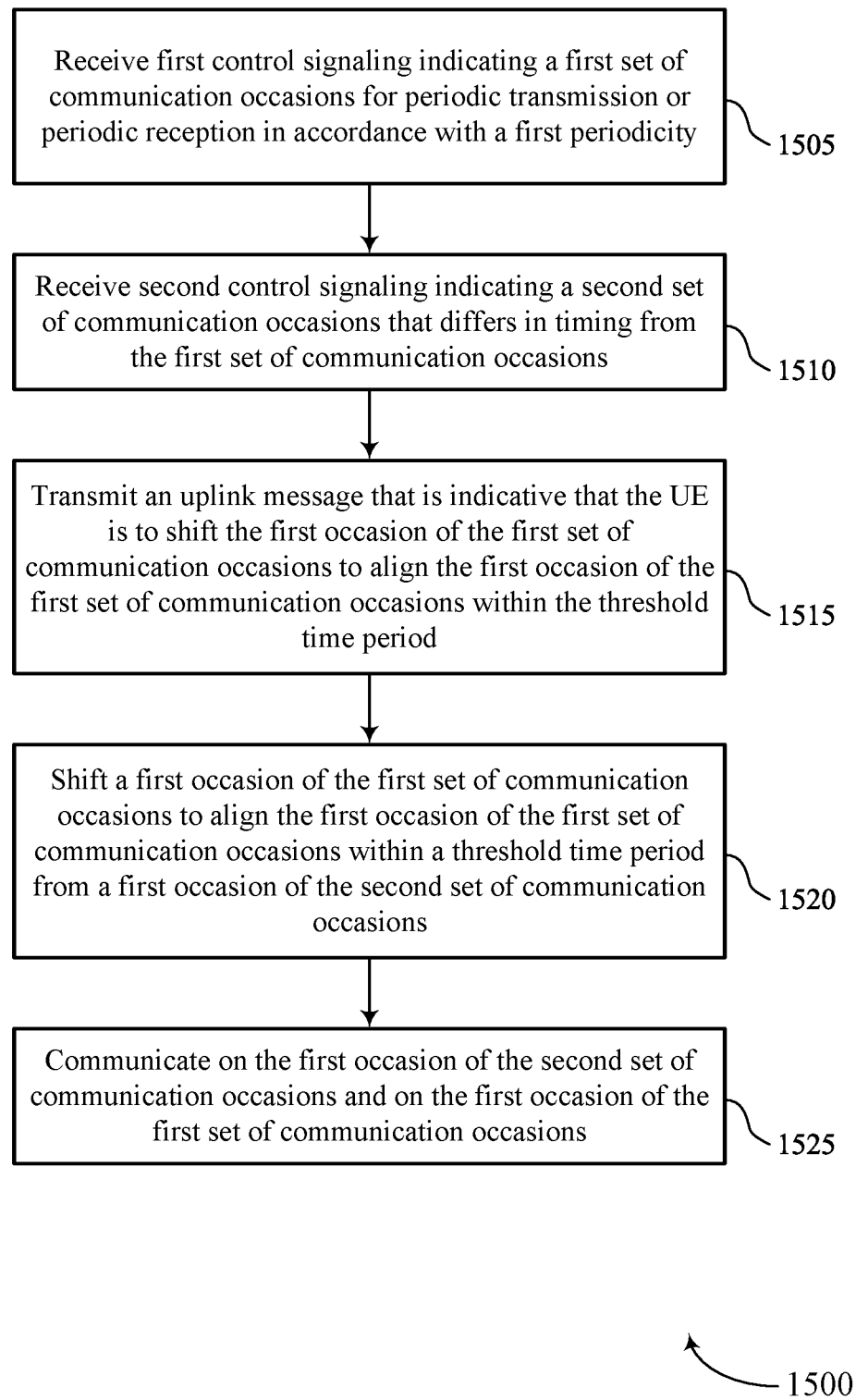

FIG. 15 illustrates a flowchart showing a method 1500 that supports techniques for aligning communications in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving first control signaling indicating a first set of communication occasions for periodic transmission or periodic reception in accordance with a first periodicity. The operations of 1505 may be performed in accordance with examples as disclosed herein. In some examples, aspects of the operations of 1505 may be performed by a control signal component 825 as described with reference to FIG. 8.

At 1510, the method may include receiving second control signaling indicating a second set of communication occasions that differs in timing from the first set of communication occasions. The operations of 1510 may be performed in accordance with examples as disclosed herein. In some examples, aspects of the operations of 1510 may be performed by a control signal component 825 as described with reference to FIG. 8.

At 1515, the method may include transmitting an uplink message that is indicative that the UE is to shift the first occasion of the first set of communication occasions to align the first occasion of the first set of communication occasions within the threshold time period. The operations of 1515 may be performed in accordance with examples as disclosed herein. In some examples, aspects of the operations of 1515 may be performed by an uplink component 840 as described with reference to FIG. 8.

At 1520, the method may include shifting a first occasion of the first set of communication occasions to align the first occasion of the first set of communication occasions within a threshold time period from a first occasion of the second set of communication occasions. The operations of 1520 may be performed in accordance with examples as disclosed herein. In some examples, aspects of the operations of 1520 may be performed by an occasion shifting component 830 as described with reference to FIG. 8.

At 1525, the method may include communicating on the first occasion of the second set of communication occasions and on the first occasion of the first set of communication occasions. The operations of 1525 may be performed in accordance with examples as disclosed herein. In some examples, aspects of the operations of 1525 may be performed by a communication component 835 as described with reference to FIG. 8.

Figure 16:
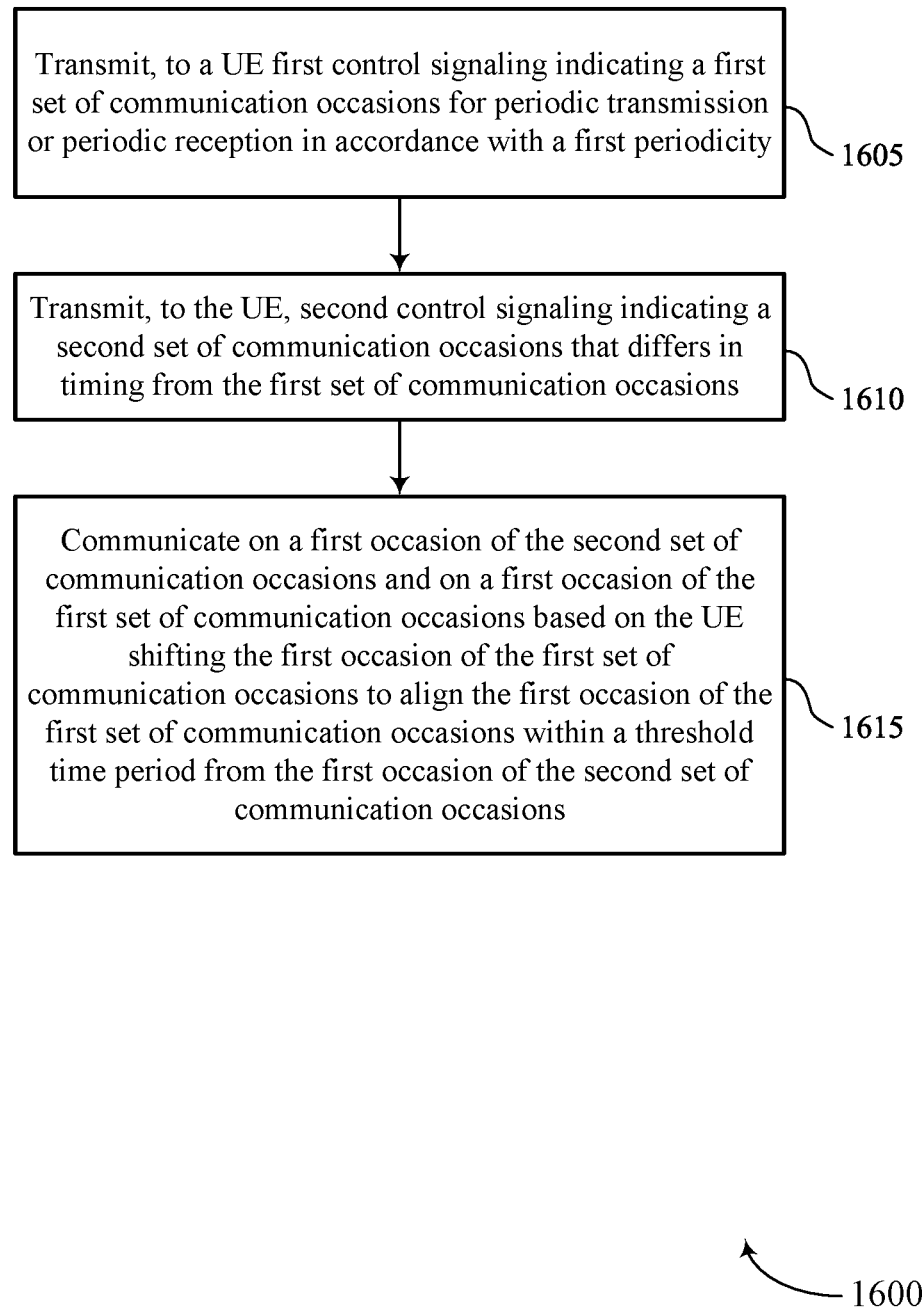

FIG. 16 illustrates a flowchart showing a method 1600 that supports techniques for aligning communications in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE first control signaling indicating a first set of communication occasions for periodic transmission or periodic reception in accordance with a first periodicity. The operations of 1605 may be performed in accordance with examples as disclosed herein. In some examples, aspects of the operations of 1605 may be performed by a control signal component 1225 as described with reference to FIG. 12.

At 1610, the method may include transmitting, to the UE, second control signaling indicating a second set of communication occasions that differs in timing from the first set of communication occasions. The operations of 1610 may be performed in accordance with examples as disclosed herein. In some examples, aspects of the operations of 1610 may be performed by a control signal component 1225 as described with reference to FIG. 12.

At 1615, the method may include communicating on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions. The operations of 1615 may be performed in accordance with examples as disclosed herein. In some examples, aspects of the operations of 1615 may be performed by a communication component 1230 as described with reference to FIG. 12.

Figure 17:
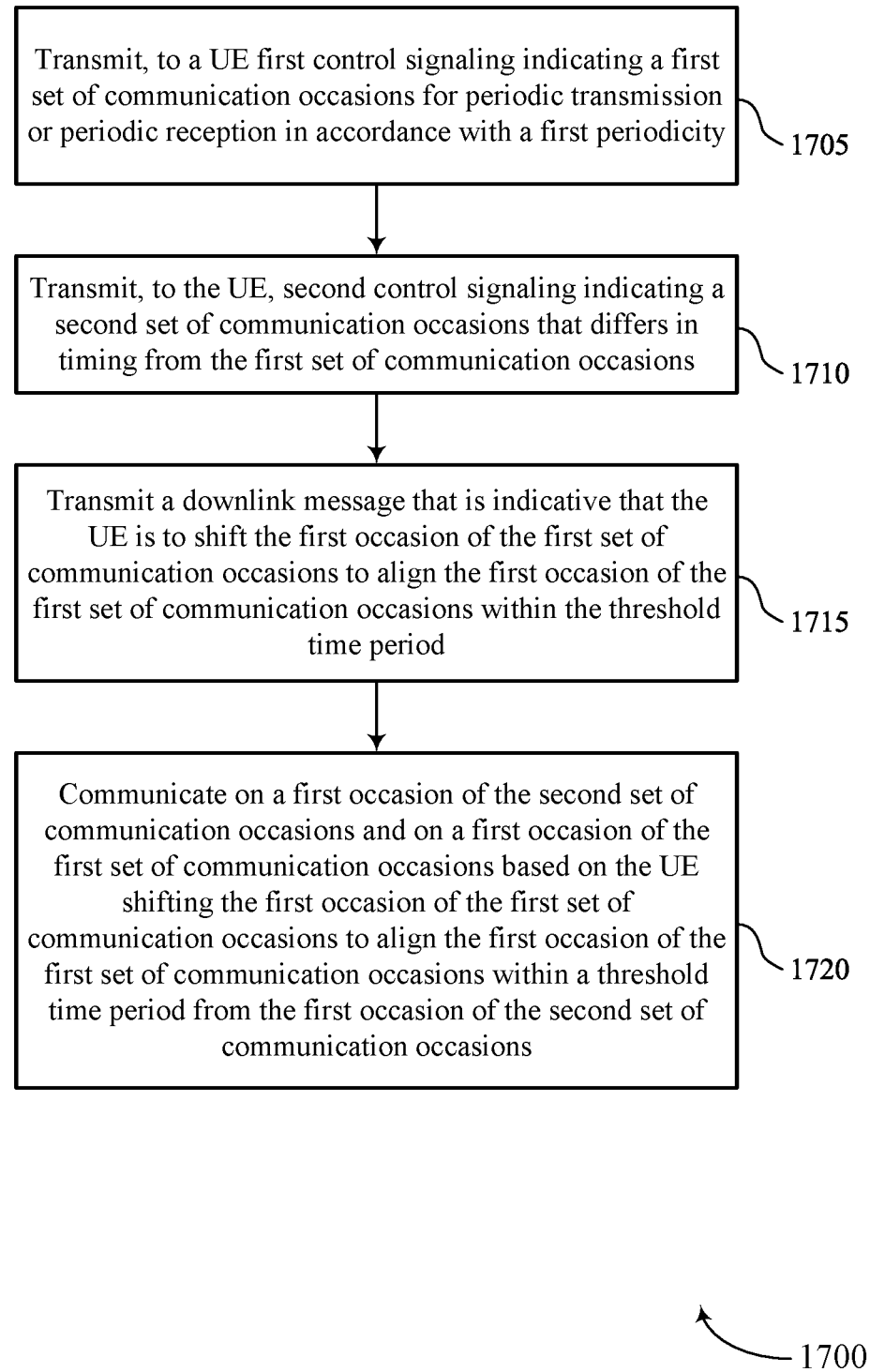

FIG. 17 illustrates a flowchart showing a method 1700 that supports techniques for aligning communications in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE first control signaling indicating a first set of communication occasions for periodic transmission or periodic reception in accordance with a first periodicity. The operations of 1705 may be performed in accordance with examples as disclosed herein. In some examples, aspects of the operations of 1705 may be performed by a control signal component 1225 as described with reference to FIG. 12.

At 1710, the method may include transmitting, to the UE, second control signaling indicating a second set of communication occasions that differs in timing from the first set of communication occasions. The operations of 1710 may be performed in accordance with examples as disclosed herein. In some examples, aspects of the operations of 1710 may be performed by a control signal component 1225 as described with reference to FIG. 12.

At 1715, the method may include transmitting a downlink message that is indicative that the UE is to shift the first occasion of the first set of communication occasions to align the first occasion of the first set of communication occasions within the threshold time period. The operations of 1715 may be performed in accordance with examples as disclosed herein. In some examples, aspects of the operations of 1715 may be performed by a downlink component 1240 as described with reference to FIG. 12.

At 1720, the method may include communicating on a first occasion of the second set of communication occasions and on a first occasion of the first set of communication occasions based on the UE shifting the first occasion of the first set of communication occasions to align the first occasion of the first set of communication occasions within a threshold time period from the first occasion of the second set of communication occasions. The operations of 1720 may be performed in accordance with examples as disclosed herein. In some examples, aspects of the operations of 1720 may be performed by a communication component 1230 as described with reference to FIG. 12.

The following provides an overview of aspects of the present disclosure:

Aspect 1: A method for wireless communication at a UE, comprising: receiving first control signaling indicating a first set of communication occasions for periodic transmission or periodic reception in accordance with a first periodicity; receiving second control signaling indicating a second set of communication occasions that differs in timing from the first set of communication occasions; shifting a first occasion of the first set of communication occasions to align the first occasion of the first set of communication occasions within a threshold time period from a first occasion of the second set of communication occasions; and communicating on the first occasion of the second set of communication occasions and on the first occasion of the first set of communication occasions.

Aspect 2: The method of aspect 1, wherein the second set of communication occasions differs in timing from the first set of communication occasions through a timing of the first occasion of the second set of communication occasions with respect to the first occasion of the first set of communication occasions or through a second periodicity for the second set of communication occasions with respect to the first periodicity.

Aspect 3: The method of any of aspects 1 through 2, further comprising: transmitting an uplink message that is indicative that the UE is to shift the first occasion of the first set of communication occasions to align the first occasion of the first set of communication occasions within the threshold time period.

Aspect 4: The method of aspect 3, wherein the uplink message is a scheduling request that is not associated with a corresponding buffer status report.

Aspect 5: The method of any of aspects 3 through 4, wherein the uplink message is a scheduling request that includes a flag to distinguish the scheduling request from a legacy request associated with a buffer status report.

Aspect 6: The method of any of aspects 3 through 5, wherein transmitting the uplink message further comprises: transmitting an indication of a time by which the first occasion of the second set of communication occasions is to be shifted.

Aspect 7: The method of any of aspects 3 through 6, wherein transmitting the uplink message comprises: transmitting the uplink message in resources dedicated for indicating that the UE is to shift the first occasion of the first set of communication occasions to align the first occasion of the first set of communication occasions within the threshold time period.

Aspect 8: The method of any of aspects 3 through 7, wherein transmitting the uplink message comprises: transmitting the uplink message multiplexed with a scheduled configured grant physical uplink shared channel message.

Aspect 9: The method of any of aspects 3 through 8, wherein shifting the first occasion of the first set of communication occasions comprises: shifting the first occasion of the first set of communication occasions by a timing value with respect to a transmission time of the uplink message.

Aspect 10: The method of any of aspects 3 through 9, wherein shifting the first occasion of the first set of communication occasions comprises: shifting the first occasion of the first set of communication occasions by a timing value with respect to a timing of an anchor configured grant transmission occasion.

Aspect 11: The method of any of aspects 1 through 10, further comprising: receiving a downlink message that is indicative that the UE is to shift the first occasion of the first set of communication occasions to align the first occasion of the first set of communication occasions within the threshold time period.

Aspect 12: The method of aspect 11, wherein the downlink message is one of a scheduling downlink control information message or a non-scheduling downlink control information message.

Aspect 13: The method of any of aspects 11 through 12, wherein shifting the first occasion of the first set of communication occasions is conditioned on the first occasion of the first set of communication occasions being at least a minimum time duration, prior to shifting, after receipt of the downlink message.

Aspect 14: The method of any of aspects 11 through 13, wherein shifting the first occasion of the first set of communication occasions is conditioned on the first occasion of the first set of communication occasions being less than a maximum time duration before or after the first occasion of the second set of communication occasions.

Aspect 15: The method of any of aspects 11 through 14, wherein the downlink message includes a dynamic triggering offset indicating an amount of time the first occasion of the first set of communication occasions is to be shifted.

Aspect 16: The method of any of aspects 1 through 15, further comprising: receiving a single downlink control information message that schedules multiple resource allocations for uplink transmissions; and selecting one of the multiple resource allocations as the first occasion of the second set of communication occasions, the selection based at least in part on a timing proximity of the first occasion of the first set of communication occasions with individual ones of the multiple resource allocations.

Aspect 17: The method of any of aspects 1 through 16, wherein the first set of communication occasions is associated with a first configured grant, and the second set of communication occasions is associated with a second configured grant.

Aspect 18: The method of any of aspects 1 through 17, wherein the first set of communication occasions is associated with a configured grant, and the second set of communication occasions is associated with a dynamic grant.

Aspect 19: The method of any of aspects 1 through 18, wherein the first set of communication occasions is associated with a first semi-persistent scheduling configuration, and wherein the second set of communication occasions is associated with a connected mode discontinuous reception (CDRX) configuration, the method further comprising: monitoring for a wake up signal, wherein failure to detect the wake up signal triggers the shifting of the first occasion of the first set of communication occasions.

Aspect 20: A method for wireless communication at a network entity, comprising: transmitting, to a UE first control signaling indicating a first set of communication occasions for periodic transmission or periodic reception in accordance with a first periodicity; transmitting, to the UE, second control signaling indicating a second set of communication occasions that differs in timing from the first set of communication occasions; and communicating on a first occasion of the second set of communication occasions and on a first occasion of the first set of communication occasions based at least in part on the UE shifting the first occasion of the first set of communication occasions to align the first occasion of the first set of communication occasions within a threshold time period from the first occasion of the second set of communication occasions.

Aspect 21: The method of aspect 20, wherein the second set of communication occasions differs in timing from the first set of communication occasions through a timing of the first occasion of the second set of communication occasions with respect to the first occasion of the first set of communication occasions or through a second periodicity for the second set of communication occasions with respect to the first periodicity.

Aspect 22: The method of any of aspects 20 through 21, further comprising: receiving an uplink message that is indicative that the UE is to shift the first occasion of the first set of communication occasions to align the first occasion of the first set of communication occasions within the threshold time period.

Aspect 23: The method of aspect 22, wherein the uplink message is a scheduling request that is not associated with a corresponding buffer status report.

Aspect 24: The method of any of aspects 22 through 23, wherein the uplink message is a scheduling request that includes a flag to distinguish the scheduling request from a legacy request associated with a buffer status report.

Aspect 25: The method of any of aspects 22 through 24, wherein receiving the uplink message further comprises: receiving an indication of a time by which the first occasion of the second set of communication occasions is to be shifted.

Aspect 26: The method of any of aspects 22 through 25, wherein receiving the uplink message comprises: receiving the uplink message in resources dedicated for indicating that the UE is to shift the first occasion of the first set of communication occasions to align the first occasion of the first set of communication occasions within the threshold time period.

Aspect 27: The method of any of aspects 22 through 26, wherein receiving the uplink message comprises: receiving the uplink message multiplexed with a scheduled configured grant physical uplink shared channel message.

Aspect 28: The method of any of aspects 22 through 27, wherein the UE shifts the first occasion of the first set of communication occasions by a timing value with respect to a transmission time of the uplink message.

Aspect 29: The method of any of aspects 22 through 28, wherein the UE shifts the first occasion of the first set of communication occasions by a timing value with respect to a timing of an anchor configured grant transmission occasion.

Aspect 30: The method of any of aspects 20 through 29, further comprising: transmitting a downlink message that is indicative that the UE is to shift the first occasion of the first set of communication occasions to align the first occasion of the first set of communication occasions within the threshold time period.

Aspect 31: The method of aspect 30, wherein the downlink message is one of a scheduling downlink control information message or a non-scheduling downlink control information message.

Aspect 32: The method of any of aspects 30 through 31, wherein shifting of the first occasion of the first set of communication occasions is conditioned on the first occasion of the first set of communication occasions being at least a minimum time duration, prior to shifting, after receipt of the downlink message.

Aspect 33: The method of any of aspects 30 through 32, wherein shifting of the first occasion of the first set of communication occasions is conditioned on the first occasion of the first set of communication occasions being less than a maximum time duration before or after the first occasion of the second set of communication occasions.

Aspect 34: The method of any of aspects 30 through 33, wherein the downlink message includes a dynamic triggering offset indicating an amount of time the first occasion of the first set of communication occasions is to be shifted.

Aspect 35: The method of any of aspects 20 through 34, further comprising: transmitting a single downlink control information message that schedules multiple resource allocations for uplink transmissions, wherein one of the multiple resource allocations is selected as the first occasion of the second set of communication occasions based at least in part on a timing proximity of the first occasion of the first set of communication occasions with individual ones of the multiple resource allocations.

Aspect 36: The method of any of aspects 20 through 35, wherein the first set of communication occasions is associated with a first configured grant, and the second set of communication occasions is associated with a second configured grant.

Aspect 37: The method of any of aspects 20 through 36, wherein the first set of communication occasions is associated with a configured grant, and the second set of communication occasions is associated with a dynamic grant.

Aspect 38: The method of any of aspects 20 through 37, wherein the first set of communication occasions is associated with a first semi-persistent scheduling configuration, and wherein the second set of communication occasions is associated with a connected mode discontinuous reception (CDRX) configuration, the method further comprising: transmitting a wake up signal, wherein refraining from transmitting the wake up signal triggers the shifting of the first occasion of the first set of communication occasions.

Aspect 39: An apparatus for wireless communication at a UE, comprising a processor; memory coupled with the processor; and instructions stored in the memory and executable by the processor to cause the apparatus to perform a method of any of aspects 1 through 19.

Aspect 40: An apparatus for wireless communication at a UE, comprising at least one means for performing a method of any of aspects 1 through 19.

Aspect 41: A non-transitory computer-readable medium storing code for wireless communication at a UE, the code comprising instructions executable by a processor to perform a method of any of aspects 1 through 19.

Aspect 42: An apparatus for wireless communication at a network entity, comprising a processor; memory coupled with the processor; and instructions stored in the memory and executable by the processor to cause the apparatus to perform a method of any of aspects 20 through 38.

Aspect 43: An apparatus for wireless communication at a network entity, comprising at least one means for performing a method of any of aspects 20 through 38.

Aspect 44: A non-transitory computer-readable medium storing code for wireless communication at a network entity, the code comprising instructions executable by a processor to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    a processor;
    memory coupled with the processor; and
    instructions stored in the memory and executable by the processor to cause the apparatus to:
        receive first control signaling indicating a first set of communication occasions for periodic transmission or periodic reception in accordance with a first periodicity;
        receive second control signaling indicating a second set of communication occasions that differs in timing from the first set of communication occasions;
        transmit an uplink message indicating that the UE is to shift a first occasion of the first set of communication occasions to align the first occasion of the first set of communication occasions within a threshold time period from a first occasion of the second set of communication occasions, wherein the uplink message is a scheduling request that includes a flag to distinguish the scheduling request from a legacy request associated with a buffer status report;
        shift the first occasion of the first set of communication occasions to align the first occasion of the first set of communication occasions within the threshold time period from the first occasion of the second set of communication occasions; and
        communicate on the first occasion of the second set of communication occasions and on the first occasion of the first set of communication occasions.

2. The apparatus of claim 1, wherein the second set of communication occasions differs in timing from the first set of communication occasions through a timing of the first occasion of the second set of communication occasions with respect to the first occasion of the first set of communication occasions or through a second periodicity for the second set of communication occasions with respect to the first periodicity.

3. The apparatus of claim 1, wherein the scheduling request is not associated with a corresponding buffer status report.

4. The apparatus of claim 1, wherein the instructions to transmit the uplink message are further executable by the processor to cause the apparatus to:
    transmit an indication of a time by which the first occasion of the second set of communication occasions is to be shifted.

5. The apparatus of claim 1, wherein the instructions to transmit the uplink message are executable by the processor to cause the apparatus to:
    transmit the uplink message in resources dedicated for indicating that the UE is to shift the first occasion of the first set of communication occasions to align the first occasion of the first set of communication occasions within the threshold time period.

6. The apparatus of claim 1, wherein the instructions to transmit the uplink message are executable by the processor to cause the apparatus to:
    transmit the uplink message multiplexed with a scheduled configured grant physical uplink shared channel message.

7. The apparatus of claim 1, wherein the instructions to shift the first occasion of the first set of communication occasions are executable by the processor to cause the apparatus to:
    shift the first occasion of the first set of communication occasions by a timing value with respect to a transmission time of the uplink message.

8. The apparatus of claim 1, wherein the instructions to shift the first occasion of the first set of communication occasions are executable by the processor to cause the apparatus to:
    shift the first occasion of the first set of communication occasions by a timing value with respect to a timing of an anchor configured grant transmission occasion.

9. The apparatus of claim 1, wherein the instructions are further executable by the processor to cause the apparatus to:

receive a downlink message that is indicative that the UE is to shift the first occasion of the first set of communication occasions to align the first occasion of the first set of communication occasions within the threshold time period.

10. The apparatus of claim 9, wherein the downlink message is one of a scheduling downlink control information message or a non-scheduling downlink control information message.

11. The apparatus of claim 9, wherein shifting the first occasion of the first set of communication occasions is conditioned on the first occasion of the first set of communication occasions being at least a minimum time duration, prior to shifting, after receipt of the downlink message.

12. The apparatus of claim 9, wherein shifting the first occasion of the first set of communication occasions is conditioned on the first occasion of the first set of communication occasions being less than a maximum time duration before or after the first occasion of the second set of communication occasions.

13. The apparatus of claim 9, wherein the downlink message includes a dynamic triggering offset indicating an amount of time the first occasion of the first set of communication occasions is to be shifted.

14. The apparatus of claim 1, wherein the instructions are further executable by the processor to cause the apparatus to:
receive a single downlink control information message that schedules multiple resource allocations for uplink transmissions; and
select one of the multiple resource allocations as the first occasion of the second set of communication occasions, the selection based at least in part on a timing proximity of the first occasion of the first set of communication occasions with individual ones of the multiple resource allocations.

15. The apparatus of claim 1, wherein:
the first set of communication occasions is associated with a first configured grant, and
the second set of communication occasions is associated with a second configured grant.

16. The apparatus of claim 1, wherein:
the first set of communication occasions is associated with a configured grant, and
the second set of communication occasions is associated with a dynamic grant.

17. The apparatus of claim 1, wherein the first set of communication occasions is associated with a first semi-persistent scheduling configuration, and the instructions are further executable by the processor to cause the apparatus to:
monitor for a wake up signal, wherein failure to detect the wake up signal triggers the shifting of the first occasion of the first set of communication occasions.

18. An apparatus for wireless communication at a network entity, comprising:
a processor;
memory coupled with the processor; and
instructions stored in the memory and executable by the processor to cause the apparatus to:
transmit, to a user equipment (UE) first control signaling indicating a first set of communication occasions for periodic transmission or periodic reception in accordance with a first periodicity;
transmit, to the UE, second control signaling indicating a second set of communication occasions that differs in timing from the first set of communication occasions;
receive an uplink message indicating that the UE is to shift a first occasion of the first set of communication occasions to align the first occasion of the first set of communication occasions within a threshold time period from a first occasion of the second set of communication occasions, wherein the uplink message is a scheduling request that includes a flag to distinguish the scheduling request from a legacy request associated with a buffer status report; and
communicate on the first occasion of the second set of communication occasions and on the first occasion of the first set of communication occasions based at least in part on the UE shifting the first occasion of the first set of communication occasions to align the first occasion of the first set of communication occasions within the threshold time period from the first occasion of the second set of communication occasions.

19. The apparatus of claim 18, wherein the second set of communication occasions differs in timing from the first set of communication occasions through a timing of the first occasion of the second set of communication occasions with respect to the first occasion of the first set of communication occasions or through a second periodicity for the second set of communication occasions with respect to the first periodicity.

20. The apparatus of claim 18, wherein the scheduling request is not associated with a corresponding buffer status report.

21. The apparatus of claim 18, wherein the instructions to receive the uplink message are further executable by the processor to cause the apparatus to:
receive an indication of a time by which the first occasion of the second set of communication occasions is to be shifted.

22. The apparatus of claim 18, wherein the instructions are further executable by the processor to cause the apparatus to:
transmit a downlink message that is indicative that the UE is to shift the first occasion of the first set of communication occasions to align the first occasion of the first set of communication occasions within the threshold time period.

23. The apparatus of claim 18, wherein the instructions are further executable by the processor to cause the apparatus to:
transmit a single downlink control information message that schedules multiple resource allocations for uplink transmissions, wherein one of the multiple resource allocations is selected as the first occasion of the second set of communication occasions based at least in part on a timing proximity of the first occasion of the first set of communication occasions with individual ones of the multiple resource allocations.

24. The apparatus of claim 18, wherein the first set of communication occasions is associated with a first semi-persistent scheduling configuration, and the instructions are further executable by the processor to cause the apparatus to:
transmit a wake up signal, wherein refraining from transmitting the wake up signal triggers the shifting of the first occasion of the first set of communication occasions.

25. A method for wireless communication at a user equipment (UE), comprising:

receiving first control signaling indicating a first set of communication occasions for periodic transmission or periodic reception in accordance with a first periodicity;
receiving second control signaling indicating a second set of communication occasions that differs in timing from the first set of communication occasions;
transmitting an uplink message indicating that the UE is to shift a first occasion of the first set of communication occasions to align the first occasion of the first set of communication occasions within a threshold time period from a first occasion of the second set of communication occasions, wherein the uplink message is a scheduling request that includes a flag to distinguish the scheduling request from a legacy request associated with a buffer status report;
shifting the first occasion of the first set of communication occasions to align the first occasion of the first set of communication occasions within the threshold time period from the first occasion of the second set of communication occasions; and
communicating on the first occasion of the second set of communication occasions and on the first occasion of the first set of communication occasions.

26. A method for wireless communication at a network entity, comprising:
transmitting, to a user equipment (UE) first control signaling indicating a first set of communication occasions for periodic transmission or periodic reception in accordance with a first periodicity;
transmitting, to the UE, second control signaling indicating a second set of communication occasions that differs in timing from the first set of communication occasions;
receiving an uplink message indicating that the UE is to shift a first occasion of the first set of communication occasions to align the first occasion of the first set of communication occasions within a threshold time period from a first occasion of the second set of communication occasions, wherein the uplink message is a scheduling request that includes a flag to distinguish the scheduling request from a legacy request associated with a buffer status report; and
communicating on the first occasion of the second set of communication occasions and on the first occasion of the first set of communication occasions based at least in part on the UE shifting the first occasion of the first set of communication occasions to align the first occasion of the first set of communication occasions within the threshold time period from the first occasion of the second set of communication occasions.

* * * * *